United States Patent [19]

Hamilton, Jr.

[11] Patent Number: 5,448,366
[45] Date of Patent: Sep. 5, 1995

[54] APPARATUS AND METHOD FOR NOISE DISTORTING THE PAINTING OF A HALFTONE DOT

[75] Inventor: John F. Hamilton, Jr., Rochester, N.Y.

[73] Assignee: Eastman Kodak Company, Rochester, N.Y.

[21] Appl. No.: 956,703

[22] Filed: Oct. 5, 1992

[51] Int. Cl.⁶ .................. H04N 1/387; H04N 1/40; H04N 1/52; G06K 9/40
[52] U.S. Cl. .................. 358/298; 358/454; 358/459; 358/536; 382/254
[58] Field of Search ............. 358/298, 443, 454, 456, 358/459, 530, 533, 534, 536; 382/54

[56] References Cited

U.S. PATENT DOCUMENTS

| | | | |
|---|---|---|---|
| 2,304,163 | 12/1942 | Goldsmith | 178/7.5 |
| 3,911,480 | 10/1975 | Brucker | 358/75 |
| 3,922,484 | 11/1975 | Keller | 358/459 X |
| 4,115,816 | 9/1978 | Moe et al. | 358/283 |
| 4,149,183 | 4/1979 | Pellar et al. | 358/75 |
| 4,196,451 | 4/1980 | Pellar | 358/459 |
| 4,498,108 | 2/1985 | Lindemann et al. | 358/298 X |
| 4,547,812 | 10/1985 | Waller et al. | 358/298 X |
| 4,566,042 | 1/1986 | Cahill | 358/298 X |
| 4,680,645 | 7/1987 | Dispoto et al. | 358/298 |
| 4,727,430 | 2/1988 | Miwa | 358/298 X |
| 4,768,101 | 8/1988 | Webb | 358/298 |
| 4,916,545 | 4/1990 | Granger | 358/456 |
| 4,918,622 | 4/1990 | Granger et al. | 358/298 X |
| 4,924,301 | 5/1990 | Surbrook | 385/454 X |
| 4,977,458 | 12/1990 | Granger et al. | 358/456 |
| 5,081,528 | 1/1992 | Hayashi et al. | 358/298 X |
| 5,109,283 | 4/1992 | Carley | 358/298 |
| 5,233,441 | 8/1993 | Hamilton | 358/298 X |
| 5,239,391 | 8/1993 | Hamilton | 358/298 X |
| 5,305,118 | 4/1994 | Schiller et al. | 358/456 |
| 5,315,407 | 5/1994 | Sakamoto et al. | 358/456 |

Primary Examiner—Benjamin R. Fuller
Assistant Examiner—Eric Frahm
Attorney, Agent, or Firm—Edward Dugas

[57] ABSTRACT

A method and associated apparatus is implemented in a halftone printing system that permits a halftone dot of the type that is represented by an envelope that is formed from a combination of straight lines that are drawn from tangent points to be position modulated by a displacement engine to introduce noise into the screener.

16 Claims, 21 Drawing Sheets

APPARATUS AND METHOD FOR NOISE DISTORTING THE PAINTING OF A HALFTONE DOT

CROSS-REFERENCE TO RELATED APPLICATION

The present application is related to the following:

U.S. patent application Ser. No. 854,176, filed Mar. 20, 1992, entitled "An Apparatus for Halftone Dot Representation", U.S. Pat. No. 5,239,391.

U.S. patent application Ser. No. 854,164, filed Mar. 20, 1992, entitled "An Envelope Method for Halftone Dot Representation", U.S. Pat. No. 5,233,441.

FIELD OF THE INVENTION

The present invention is directed to the field of halftone printing wherein arrays of bit maps are used to form dot shapes on the printing media and more particularly to a unique implementation for introducing noise into the formation of the dots for minimizing the presence of moires.

BACKGROUND OF THE INVENTION

In the halftone printing art variations in the density of a color are represented by variations in the size (area) of small dots on a grid pattern. This permits the visual detection of shades of gray and color tone. A patent of interest for its teaching of dot size being a function of density is U.S. Pat. No. 4,680,645, entitled "Method For Rendering Gray Scale Images With Variable Dot Sizes" by Dispoto et al. With such methods the dots themselves do not have to be circular in shape but can have any number of shapes. With the advent of digital computers and digital printers into the printing art, digital bits, representing the desired sizing and shape of the dots, are stored and accessed from the computer or printer's memory and are used to cause the desired printing of the images onto hard copy. In digital systems the halftone dot shapes may be stored either as arrays of threshold values (e.g., 64×64×8 bits) or as arrays of bitmaps (e.g., 64×64×256 bits). The quality of the shape of the dots is a function of the number of bits (sample points) that are used in the printing process. Obviously, as more bits are used to increase the quality of the formed dot the greater will be the use of the computer or printer's memory space. In addition, with more bits stored in memory the longer it will take, in terms of access time, to call forth all the bits needed to drive the printing device. In the art, the number of sample points used to represent an image in an array of spaced rows and columns of sample points is called the mesh. It has been shown that there is an improvement in the quality of formed dots when the number of sample points in an array increases. What is known is that sampling in a 256×256 array or a 128×128 array, in place of a 64×64 array, achieves only a slightly improved dot shape at the cost of 16 times and 4 times, respectively, in the amount of memory required to store the threshold or bitmap values.

In addition to the above mentioned increase in memory requirement, to achieve an increase in the quality of the formed dots when a digital screening pattern is used to print out the dots a problem of automoire or patterning is created. This is caused by the step of re-sampling the already sampled dot shapes. These problems have caused a great deal of development time to be spent looking for the "magic" combinations of screen rulings and screen angles that will produce dots without moire through the entire range of dot sizes. The present invention provides an improved solution to these problems.

In U.S. Pat. No. 4,977,458 entitled "Apparatus For Addressing A Font To Suppress Moire Patterns Occurring Thereby And A Method For Use Therein" by E. M. Granger et al., there is disclosed a noise generator for generating a portion of the address used to access each bit in a stored font pattern. The noise injected into the address is sufficient to substantially suppress the amplitude of the halftone screener induced moire pattern.

SUMMARY OF THE INVENTION

The present invention builds on an "envelope" technique for defining the shape and the size of dots by approximating the dot's shape with an envelope of lines straight or curved. When a symmetrical dot, such as a square or a circle, is the selected shape only the bit values representing one-eight of the dot need be used to replicate the full dot. Also, by using lines having slopes that are exact powers of two, the required multiplications needed to form the envelope of the dot can be achieved by simply shifting bits. For the case of an "elliptical" halftone dot the "envelope" technique may still be used, but twice as much information is needed because the required degree of symmetry no longer holds.

In a preferred embodiment of the invention there is provided a displacement engine for use with a halftone screener incorporating an input for serially receiving the coordinate values of the pixels to be printed and logic circuitry for receiving a randomly selected noise value from a plurality of noise values with each value associated with one of a plurality of displacement patterns. The displacement engine also receives a noise amplitude value that is selected to scale the size of the displacement of the displacement pattern associated with the selected noise value. A compute unit displacement logic block receives the noise amplitude value and a displacement coefficient value to compute a unit displacement value for each pixel. A compute X and Y displacement values logic block receives the displacement values for each pixel and the noise value to compute therefrom the X and Y displacement values for each pixel as a function of the selected displacement pattern, and an additional logic block receives the X and Y displacement values and the coordinate values of the pixels to be printed and computes the actual X and actual Y displacement coordinates for each pixel to be printed by the halftone screener.

In the preferred method of the present invention for noise distorting the printing of a halftone dot while maintaining its area and center of gravity the following steps are called for:

a) generating a digital value for each point of a halftone dot;

b) assigning a delta deviation value to each printing point of a halftone dot such that points closest to the center of the halftone dot have the least amount of displacement and points closest to the centers of areas of quadrature dot symmetry have the most amount of displacement with such displacement being complementary such that the area of the halftone dot represented by the displaced points is the same as before the displacement; and c) printing the halftone dot by combining the delta deviation value with the associated digital value for each point of the halftone dot to cause a printing of the digital value at a position corresponding to the delta deviation value.

From the foregoing it can be seen that it is a primary object of the present invention to provide an improved displacement engine for introducing noise into a halftone screener to minimize moire patterns in a reproduction print.

It is another object of the present invention to provide an improved method for adding a controlled type of noise to a halftone printing system.

These and other objects of the present invention will become more apparent when taken in conjunction with the following description and drawings wherein like characters indicate like parts and which drawings form a part of the present description.

DESCRIPTION OF THE PREFERRED EMBODIMENTS

Figure 1A:
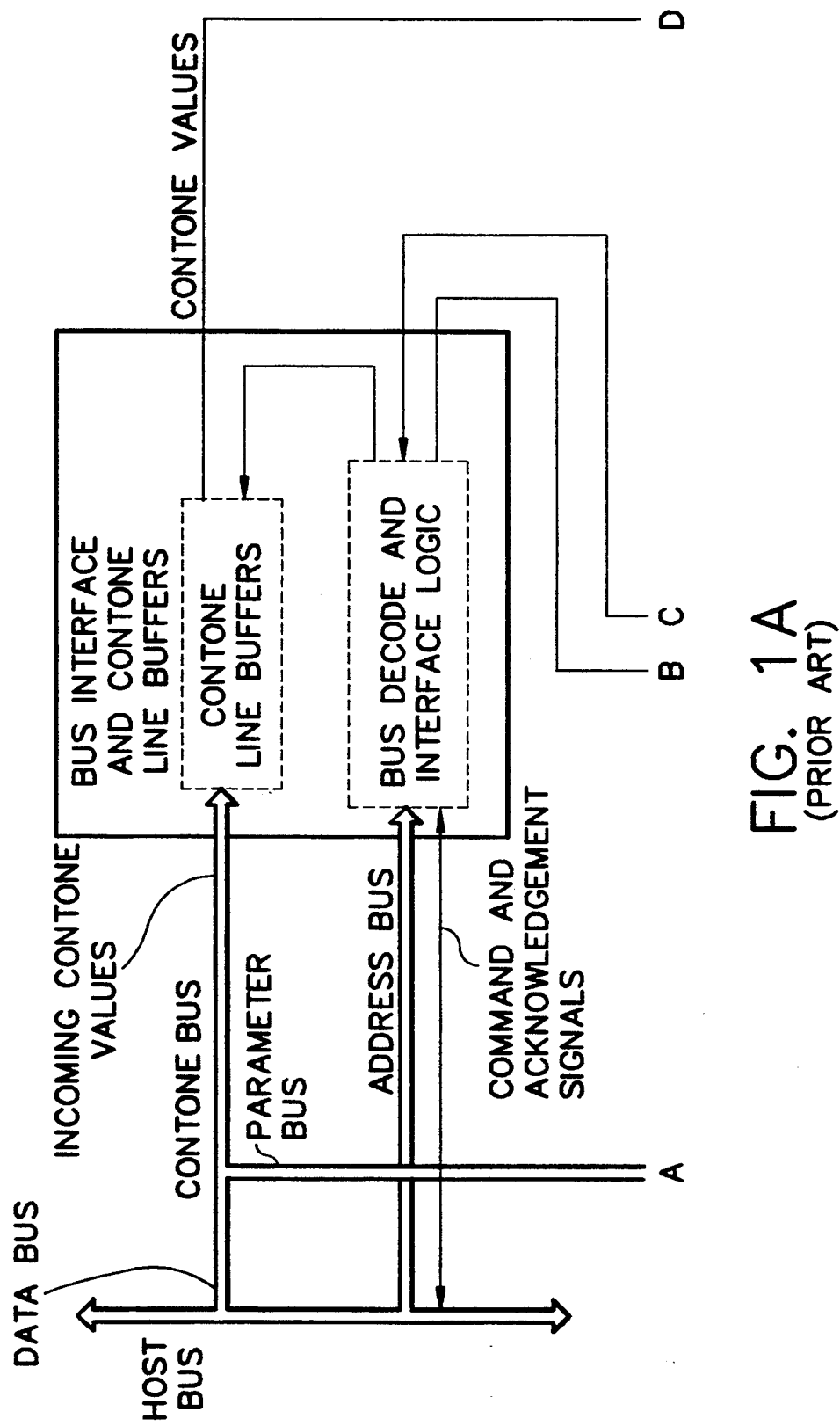
FIGS. 1A and 1B illustrate, in block diagram form, a prior art system in which the present apparatus and associated method may be implemented.

Before describing in detail the implementation of the present apparatus and the associated method in a digital halftone printing system it should be observed that the present invention resides in a novel method and unique structural combination of conventional digital signal processing components.

Accordingly, the arrangement of these conventional components have been illustrated in the drawings by readily understandable block diagrams that show only those specific details that are pertinent to the present invention, so as not to obscure the disclosure with structural details that will be readily apparent to those skilled in the art having the benefit of the teachings herein. Thus, the block diagram illustrations of the figures are primarily intended to illustrate the major structural components of the system in a convenient functional grouping, whereby the present invention may be more readily understood.

Figure 1B:
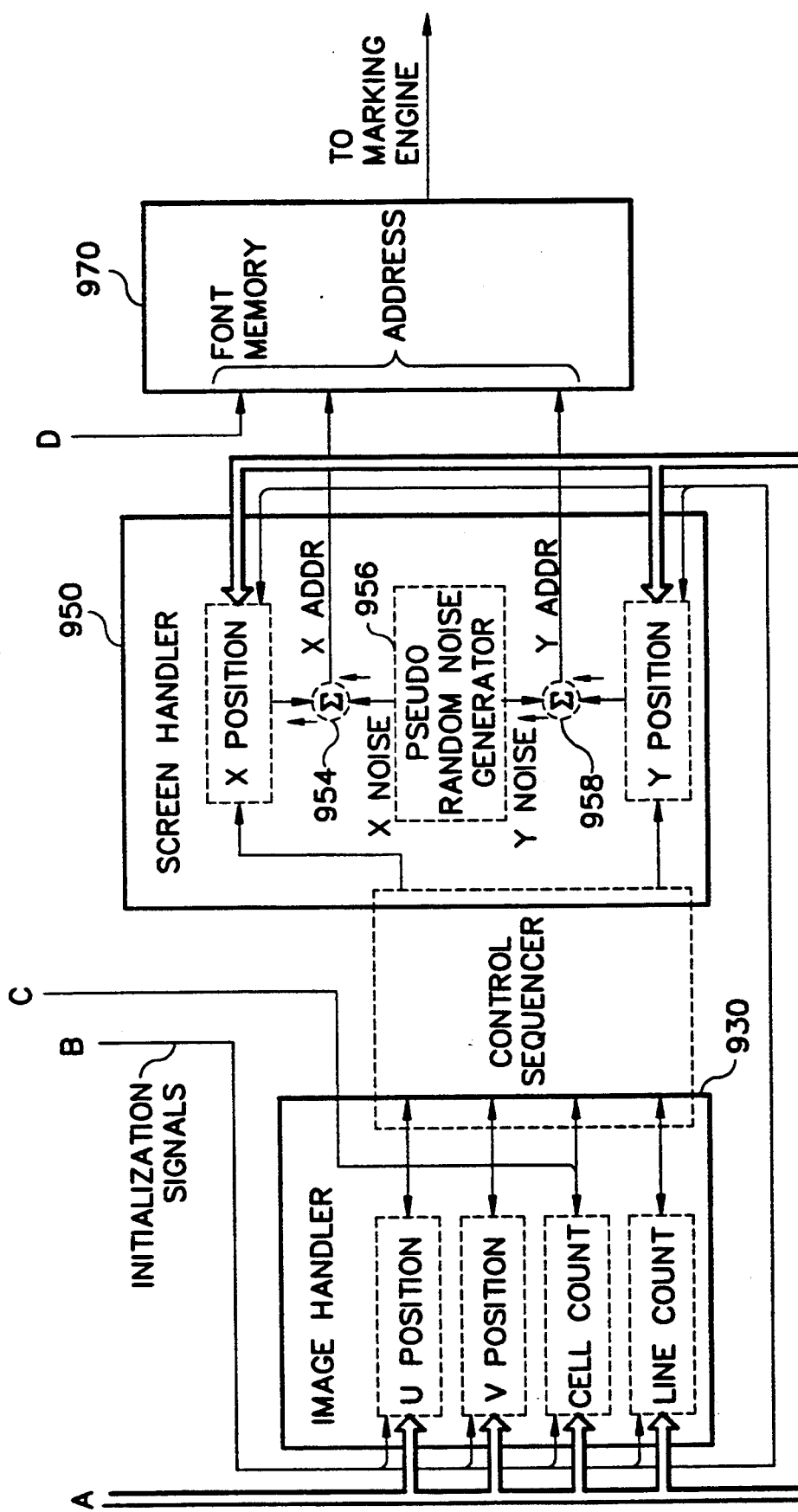

FIGS. 1A and 1B illustrate one prior art version of a digital halftone printing system incorporating a pseudo random noise generator. FIG. 1 has been taken from FIG. 9 of U.S. Pat. No. 4,918,622 entitled "Electronic Graphic Arts Screener" by E. M. Granger and J. F. Hamilton. Dr. Hamilton is also the inventor of the present invention. The teachings of U.S. Pat. No. 4,918,622 are incorporated fully herein by reference. The image to be printed by the referenced system is formed into multi-bit pixel values (contone pixel values) that are sampled in response to the requirements of the marking engine (printing device such as a laser printer). Often the multi-bit pixel value is 8-bits in depth, but other values may also be used. For example, in the simplest situation, if the input image is sampled at 400 pixels per inch and the printing device writes at 2,000 spots per inch then each contone pixel value would be sampled 5 times by a screener (see, for example, the image handler 930 as described in detail in U.S. Pat. No. 4,918,622). For those instances where the sampling rate is not an exact divisor of the writing pitch the above referenced patent describes the procedure to be used in detail. Referencing the screen handler 950 of the subject patent, the X-position and the Y-position registers provide the X and Y sampling coordinates to the font decoder 100 of the present invention, illustrated in FIG. 7. The pseudo random noise generator 956 and the summing nodes 954 and 958 shown in box 950 of the U.S. Pat. No. 4,918,622 are replaced with the present invention. The font decoder 100 also provides improved means for supplying the bit mapped data thereby eliminating the extensive and costly font memory incorporated in the prior art font memory 970.

Figure 2A:
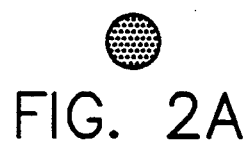
FIGS. 2A through 2I illustrate the sequence of development of dots each having a different density or area.
Figure 2B:
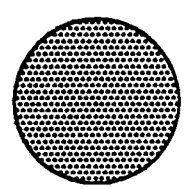
Figure 2C:
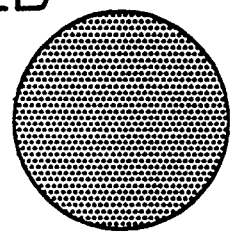

FIGS. 2A through 2C, illustrate a sequence of circular dots of increasing size (area) that would be used to create regions of increasing density in a printed image. In the present system the size of the dots is requested, for example, by the contone values described above which are typically 0 to 255.

Figure 2I:
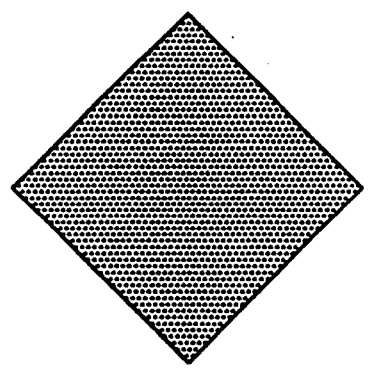
Figure 2H:
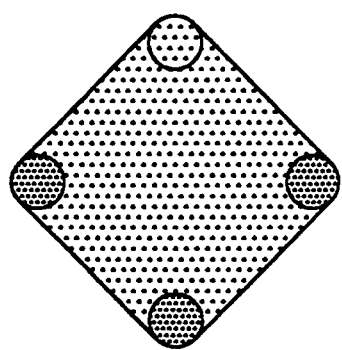
Figure 2D:
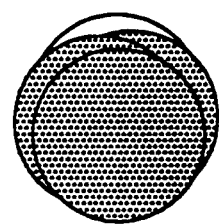
Figure 2G:
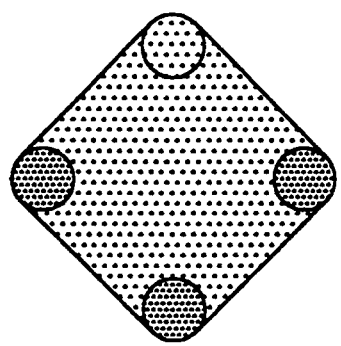
Figure 2F:
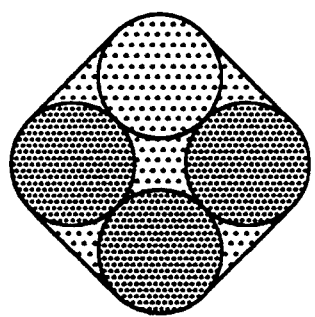
Figure 2E:
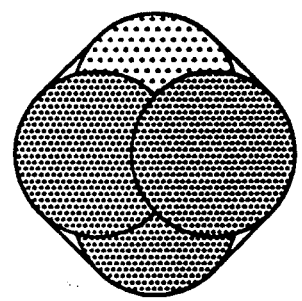

FIGS. 2D through 2I show the transition of the dot shape from one size to a larger size, using circular and straight line components. FIG. 2I illustrates a dot shaped as a diamond. Although the dot shapes selected for purposes of illustration of dot transitions start as a circular shape and transform to a diamond shape in the preferred embodiment of the invention, many other transitional variations are possible within the teachings of the present invention. For example, the starting dot shape can be a diamond.

Figure 3:
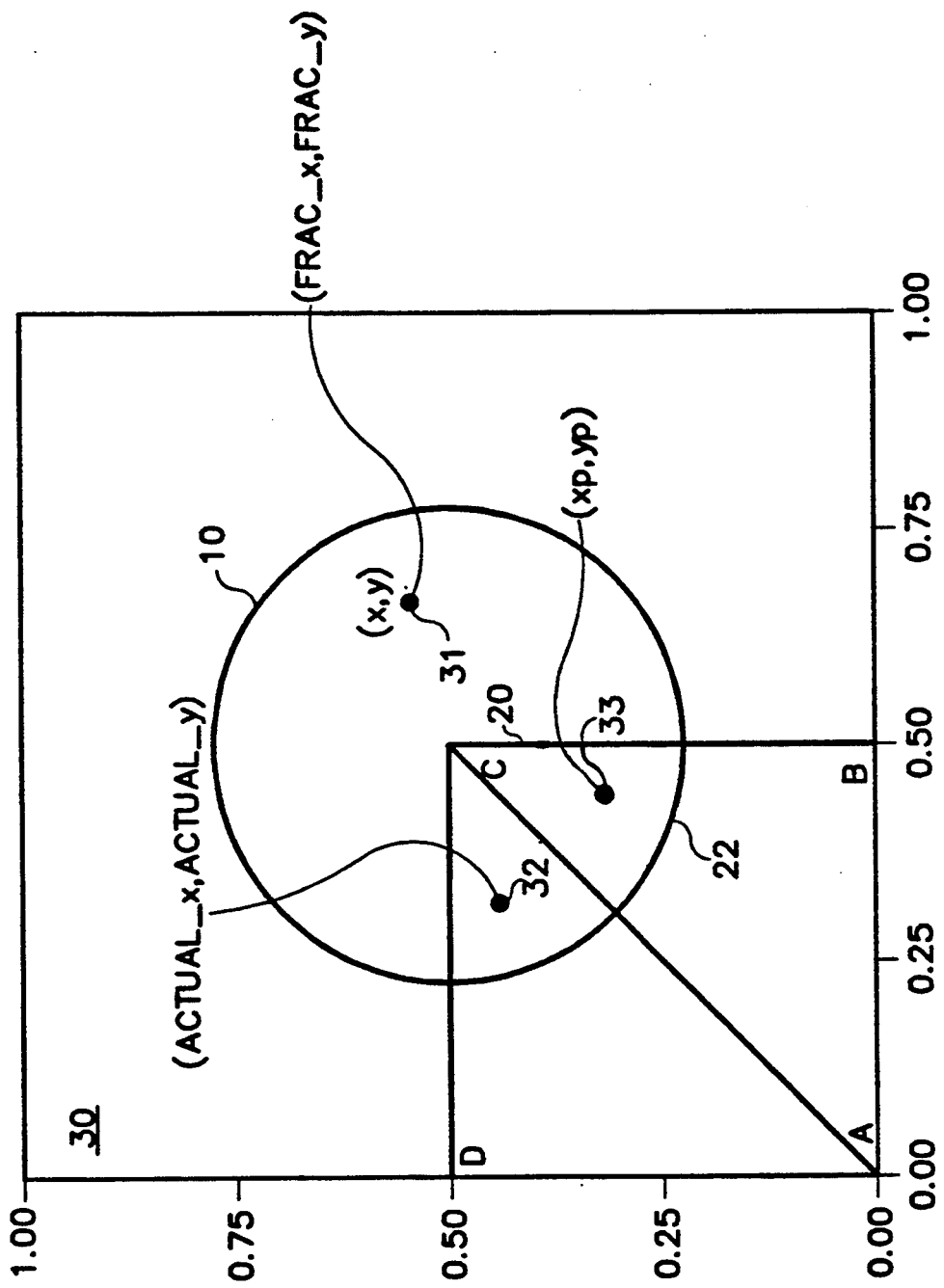
FIG. 3 illustrates the relationship of one of the circular dots of FIGS. 2A through 2C positioned within a halftone reference cell.

FIG. 3 is a diagram of a halftone reference cell 30 containing a circular dot 10. Due to the symmetry of the circular dot 10 the lower left quadrant 20, defined by vertices A, B, C, and D, represents the remaining three quadrants. One additional symmetry (about the diagonal line AC permits the restriction of the discussion to the lower right triangle ABC within the quadrant 20. A coordinate system for the reference cell 30 is shown normalized such that any point in the reference cell may be expressed as an ordered pair of values between 0 and 1.

Figure 4A:
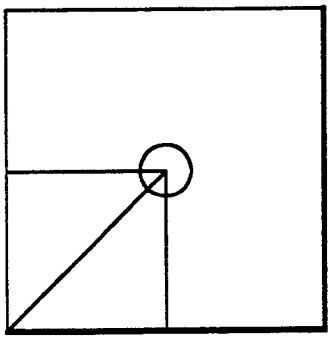
FIGS. 4A through 4I illustrate the correspondence of the dots of FIGS. 2A through 2I positioned within unit reference cells.
Figure 4B:
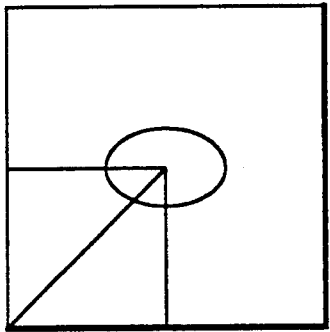
Figure 4C:
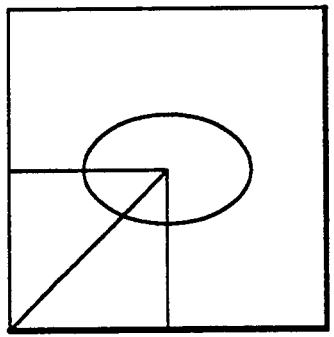
Figure 4D:
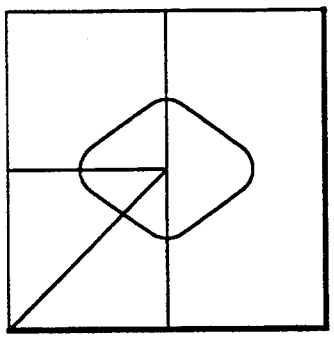
Figure 4E:
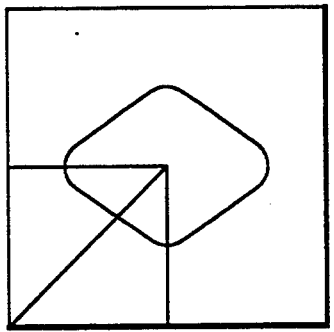
Figure 4F:
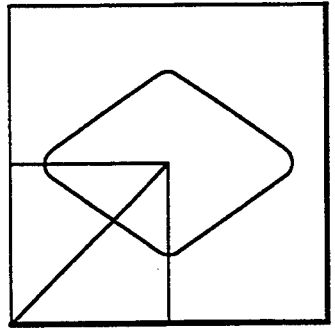
Figure 4G:
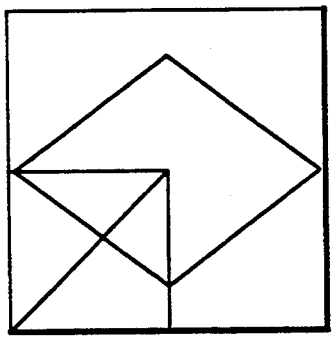
Figure 4H:
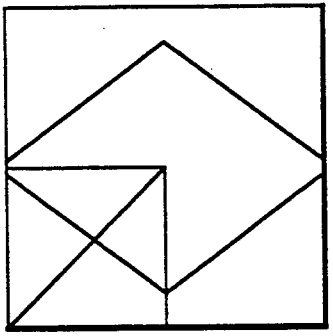
Figure 4I:
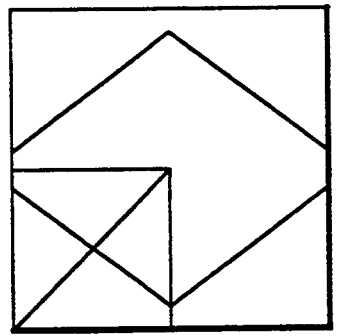

FIGS. 4A through 4I illustrate the dot transitions occurring within reference cells 30 corresponding roughly to the transitions shown in FIGS. 2A through 2I, respectively. In FIG. 4I the corners of the diamond or square are just touching the boundary wall of the unit cell.

Figure 5A:
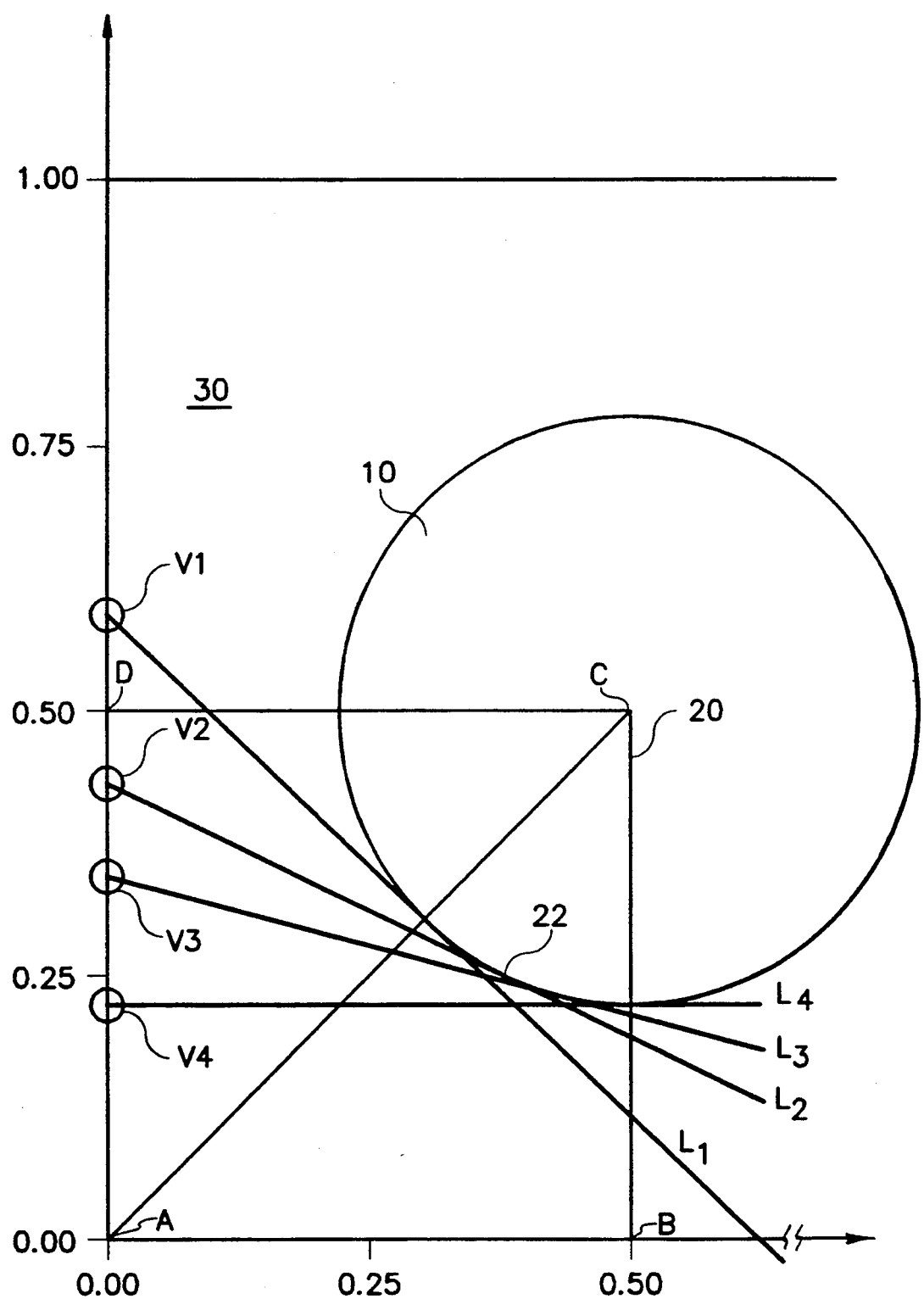
FIGS. 5A, and 5B illustrate dots having an area of less than 50% and more than 50% in a reference cell, respectively, with tangent lines intersecting an axis of the reference cell and representing a partial envelope of the dots.

FIG. 5A is another enlarged view of the segment of FIG. 3 showing four lines L1 through L4 having the slopes $-1$, $-\frac{1}{2}$, $-\frac{1}{4}$, and 0, respectively, which are tangent to the circumference of the dot shape 10 and are totally within the area bounded by the triangle ABC. The envelope formed by the lines L1 through L4 is a good approximation for the circular arc 22.

As previously stated, by multiple symmetries, in this instance eight, the information in the triangle ABC is sufficient to generate the entire halftone dot envelope. For example, the arc 22 may be used to generate the entire circular envelope of the halftone dot 10. Therefore it is sufficient to focus on representing the envelope of the dot shape only in the area of the triangle ABC as such a representation may be flipped and folded within the reference cell 30 to form the complete envelope of the dot 10. The lines L1 through L4 intersect the Y-axis at values V1 through V4, respectively. These values are recorded to represent the density of the dot 10 (size of the dot 10).

Figure 5B:
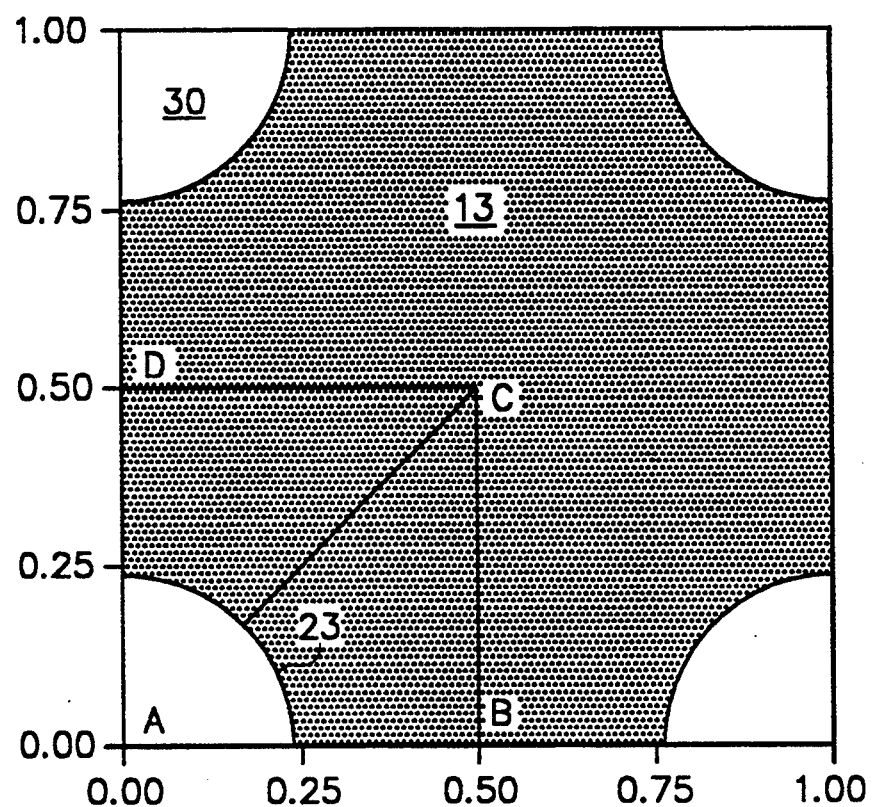
Figure 6B:
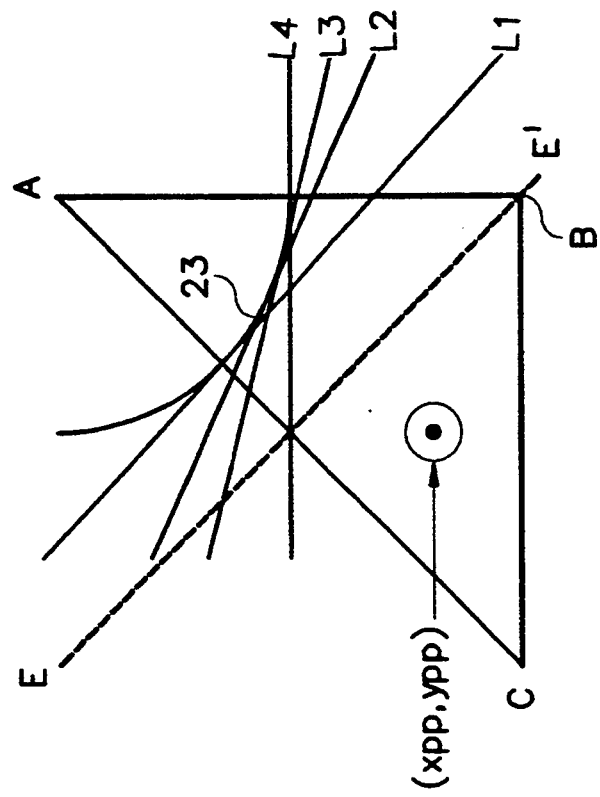
FIGS. 6A and 6B illustrate the folding of a dot formation along an axis of symmetry EE' to provide a point flip.
Figure 6A:
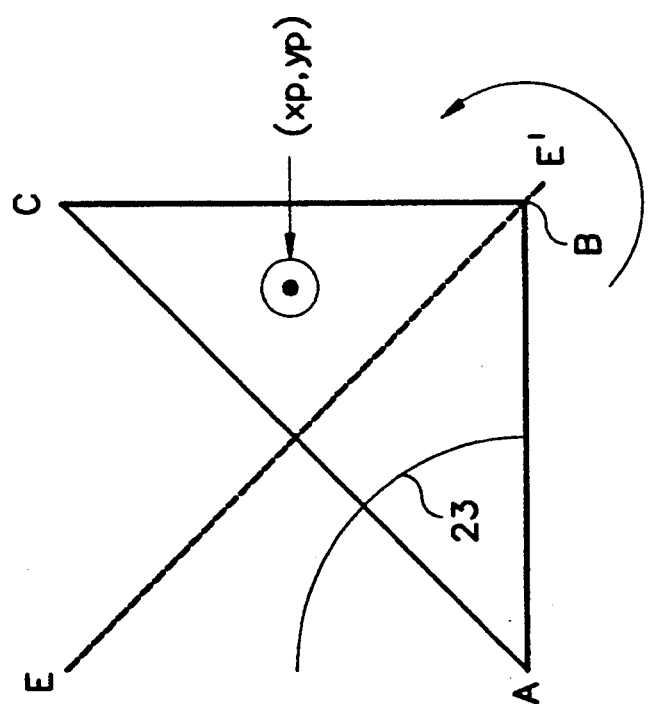

The aforementioned discussion is applicable to dots that are less than 50% of the area of the reference cell. This limit is represented by the dot shown in FIG. 4I. For dots larger than 50%, the dots' outline becomes concave rather than convex as is shown in FIG. 5B. In FIG. 5B, dot 13 is shown with major portions of its outer envelope being aligned abutting with the walls of the reference cell 30. The corner portions of the dot are concave in shape as reflected by the portion labeled 23. The region of interest will now shift to be triangle ABC. In addition to being concave curve 23 is also located in the lower left corner of triangle ABC. By rotating the triangle ABC about the axis EE', as illustrated in FIG. 6A the curve 23 moves to the upper portion of the triangle ABC and appears convex as shown in FIG. 6B. Flipping of the triangle ABC in this manner allows dots in excess of 50% to be encoded using the same methods that were used for dots less than 50%. As can be seen the tangent lines L1 through L4 still represent the envelope section (curve) 23. Whether the triangle ABC has been flipped or not is recorded in the value of bit V0 (to be discussed). Referring to the TABLE OF DOT PARAMETERS, pairs of dots of complementary area, such as 20%, and 80%, have identical parameters except for the parameter bit V0.

To cause the printing of the dot, for example, by a laser printer, there is a corresponding sample point in the unit reference cell 30 that is identified by X and Y coordinate values and a contone value that is derived from the image. The contone value is a value from 0 to $2^N-1$ where N is the number of bits per pixel. A typical value for N is 8 thus contone values would range from 0 to 255. Each contone value has a corresponding halftone dot envelope. The signal to the laser printer is then determined by whether the sample point is inside the dot envelope or not.

Referring back to FIG. 3, an arbitrary sample point 31 having coordinates (frac_X, frac_Y) is processed as follows:

If frac_X > $\frac{1}{2}$ then the component X is replaced by 1-frac_X, otherwise the component X remains unchanged. The Y component is processed similarly. Thus the arbitrary sample point has now moved to the position (actual_X, actual_Y) in the lower left quadrant of the unit reference cell since both actual_X and actual_Y must be less than or equal to $\frac{1}{2}$. Next, if actual_Y > actual_X interchange the values of X and Y, otherwise leave them unchanged. The arbitrary sample point has now moved to the position (Xp, Yp) in the triangle ABC since both Xp and Yp are less than or equal to $\frac{1}{2}$ and Yp is less than or equal to Xp. Because of the dot shape symmetry the original point (frac_X, frac_Y) is inside the dot boundary if and only if the point (Xp, Yp) is inside the dot boundary.

It is to be remembered that the selection of four intercept lines is driven by the particular hardware implementation to be described and that other numbers of lines can also be used, that is, either less and or more lines can be used to define the envelope of the formed dot. It additionally is to be appreciated that other geometric elements besides lines may also be used to represent the envelope of the dot, for example, circular and parabolic arcs or Bezier curves and or splines.

Up to this point in the description the dots have been shown formed of circles for smaller sizes (densities) and diamonds or squares for the larger sizes. It is to be appreciated that other shapes of dots, for example, ellipses may also be handled by the method of this invention.

FIG. 5B illustrates the dot pattern when the size of the dot exceeds that of the full diamond of FIG. 4I. In that instance the open spaces around the diamond dot shape commence to reduce in size and or close. This reduction of the open corner spaces occurs in the reverse order of that shown in FIGS. 2A through 2I. That is, as the dark part of the dot fills in, the open areas close towards circle shapes that appear in each of the four corners of the halftone reference cell. FIG. 5B illustrates this more clearly for a dot pattern that has an area that almost fills the entire halftone cell.

Figure 7:
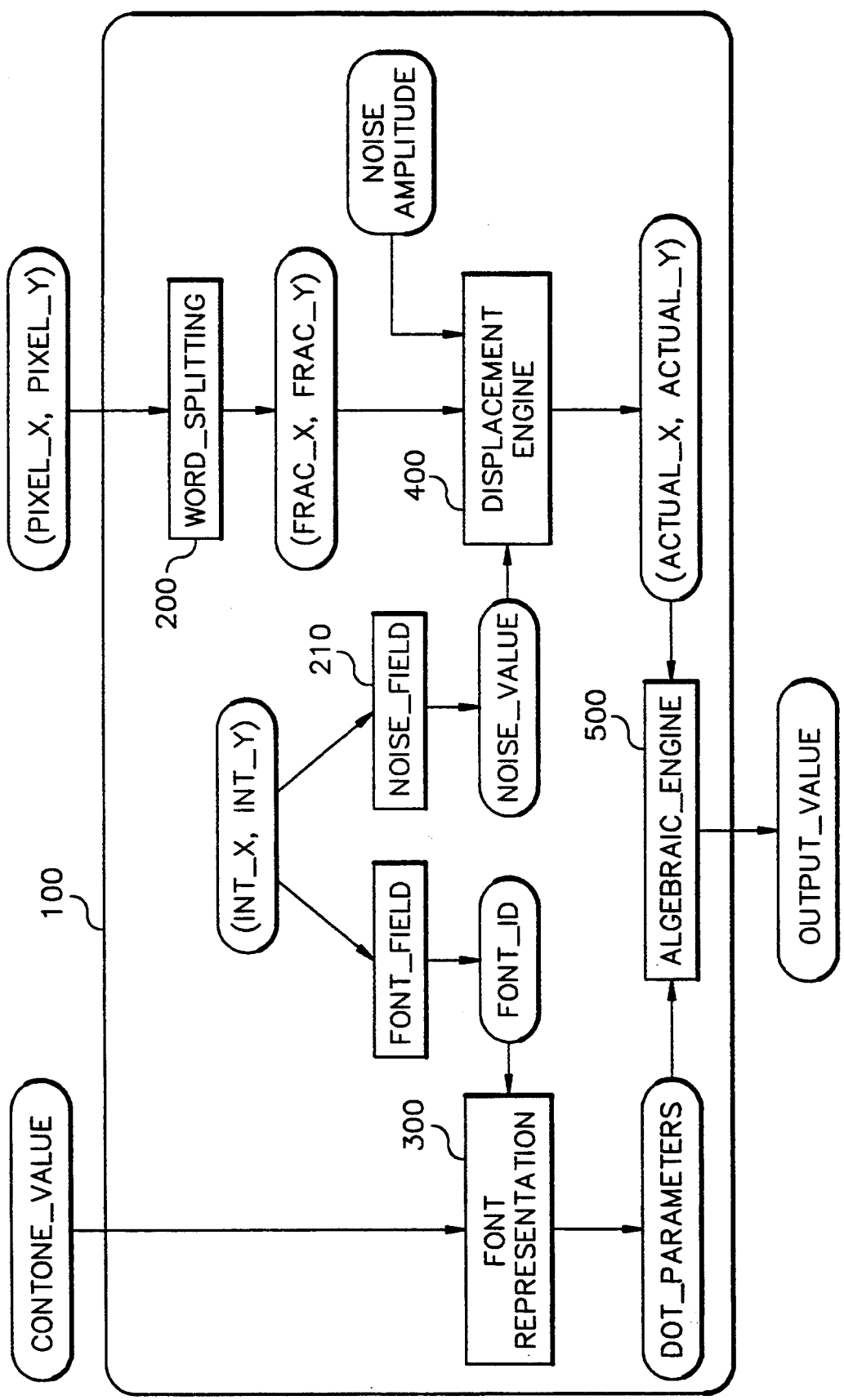
FIG. 7 illustrates, in logic block diagram form, a functional embodiment of the invention incorporating the displacement engine of the present invention.

Referring to FIG. 7, the font decoder 100, is shown in functional detail receiving as inputs the contone value and the X-Y halftone sampling coordinates (pixel_X, pixel_Y) corresponding to the pixel that is to be written (printed). The output value from the font decoder 100 is the bit mapped data that is used to drive a marking engine such as a laser printer. The contone value, as previously stated, has a value of from 0 to 255 and indicates the desired size (density) of the halftone dot. These three values are generated according to the teachings of U.S. Pat. No 4,977,458.

Figure 8:
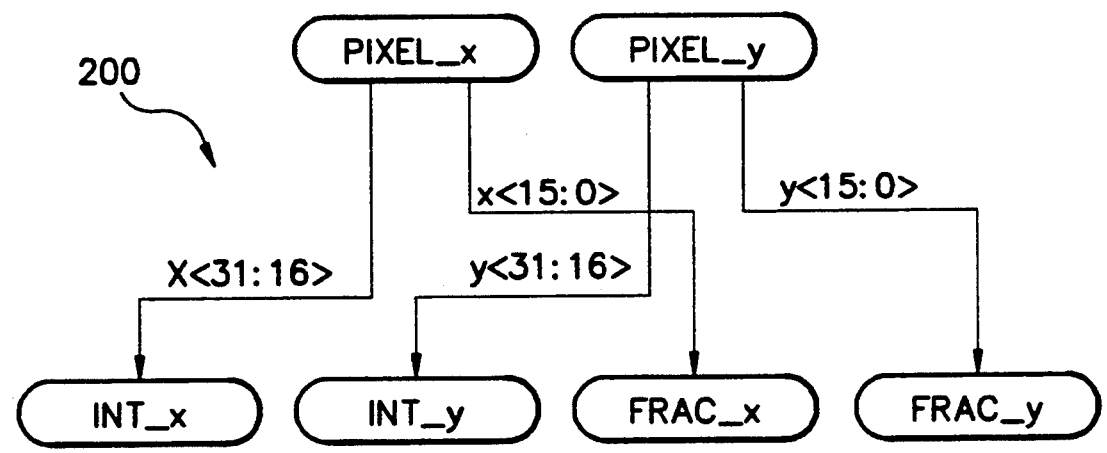
FIG. 8 illustrates, in further detail, the Word_Splitting block of FIG. 7.

Within the font decoder 100 a word splitting module 200, illustrated in logic detail in FIG. 8, functions to form two signal groups of high and low order bits, int and frac, respectively. The values, int_X and int_Y are represented by 2-bytes (16 bits of the bits defining pixel_X and pixel_Y) and the values, frac_X and frac_Y are represented by 2-bytes of low order bits. The high order bytes represent the integer value of pixel position and the low order bytes represent the fractional value of the pixel's X-Y coordinate position. The integer byte values are used to select, from a font representation module 300, which font is to be printed. In the most limited system only one font type would be available. Although many different types of storage devices may be used to addressably store the dot parameters in the preferred embodiment of the invention a look-up table (array) was used. A partial address is obtained by the contone value with the remainder being obtained from the font_id (when multiple fonts are provided).

Figure 9:
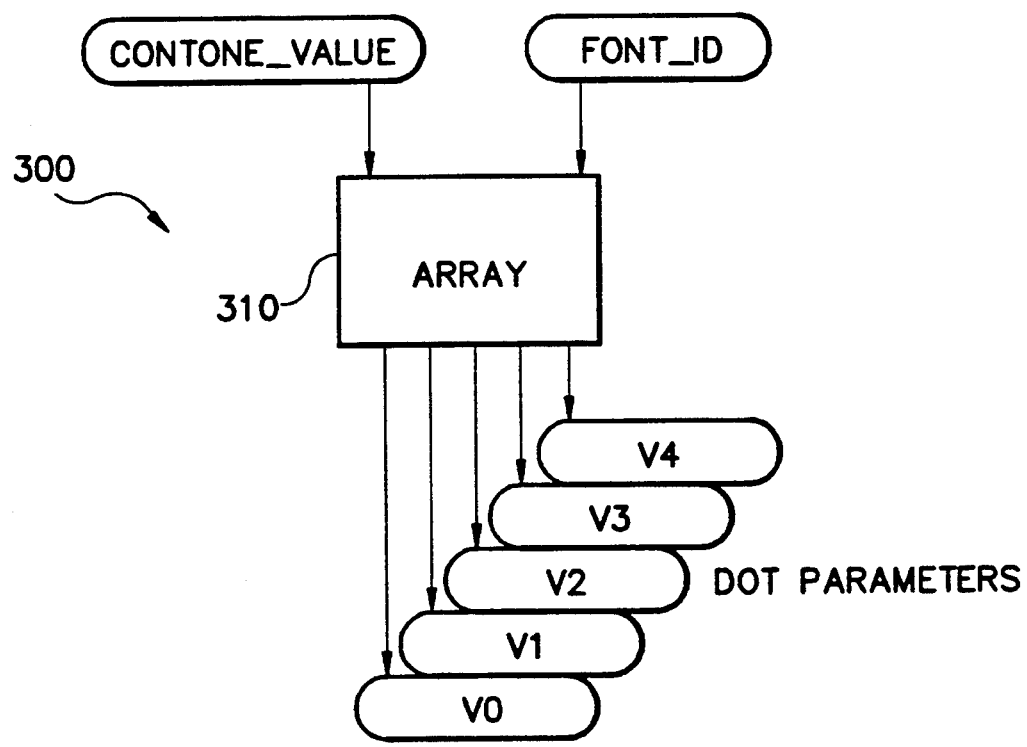
FIG. 9 illustrates, in further detail, the Font Representation block of FIG. 7.

The font representation module 300, illustrated in logic form in FIG. 9, is an array 310 of dot descriptors having a dot descriptor for each contone value. Each dot descriptor is a set of dot parameters in which all necessary dot information needed for reconstruction is encoded. For each combination of contone_value and font_id there is a unique set of dot parameters V0-V4 that is sent to an algebraic engine 500.

The following Table illustrates the values V0-V4 for dot percentages of 10, 20, 40, 60 and 80 size. The values of V1-V4 are encoded assuming a 16-bit integer representation as an example. Thus values of 0-65535 represent the full range of 0-1 on the edge of the reference cell (see 5A).

| TABLE OF DOT PARAMETERS | | | | | |
| --- | --- | --- | --- | --- | --- |
| Area | V0 | V1 | V2 | V3 | V4 |
| 10% | 0 | 49000 | 36079 | 25047 | 21075 |
| 20% | 0 | 42150 | 30664 | 15063 | 16232 |
| 40% | 0 | 36227 | 0 | 0 | 0 |
| 60% | 1 | 36227 | 0 | 0 | 0 |
| 80% | 1 | 42150 | 30664 | 15063 | 16232 |

The algebraic engine 500 determines how the dot is sampled. The four units, word_splitting 200, font representation 300, displacement engine 400 and algebraic engine 500 work together to form, stepwise, the correctly sized and shaped dot pattern for each of the pixel values that in turn form the printed image.

In prior art systems the halftone dot font is sampled at a regular interval corresponding to the writing raster. Variations in dot shape are achieved by storing multiple fonts. In the present system variations in dot shape are achieved by sampling a single halftone font at positions that deviate from the positions that the prior art screeners would have used.

Figure 10:
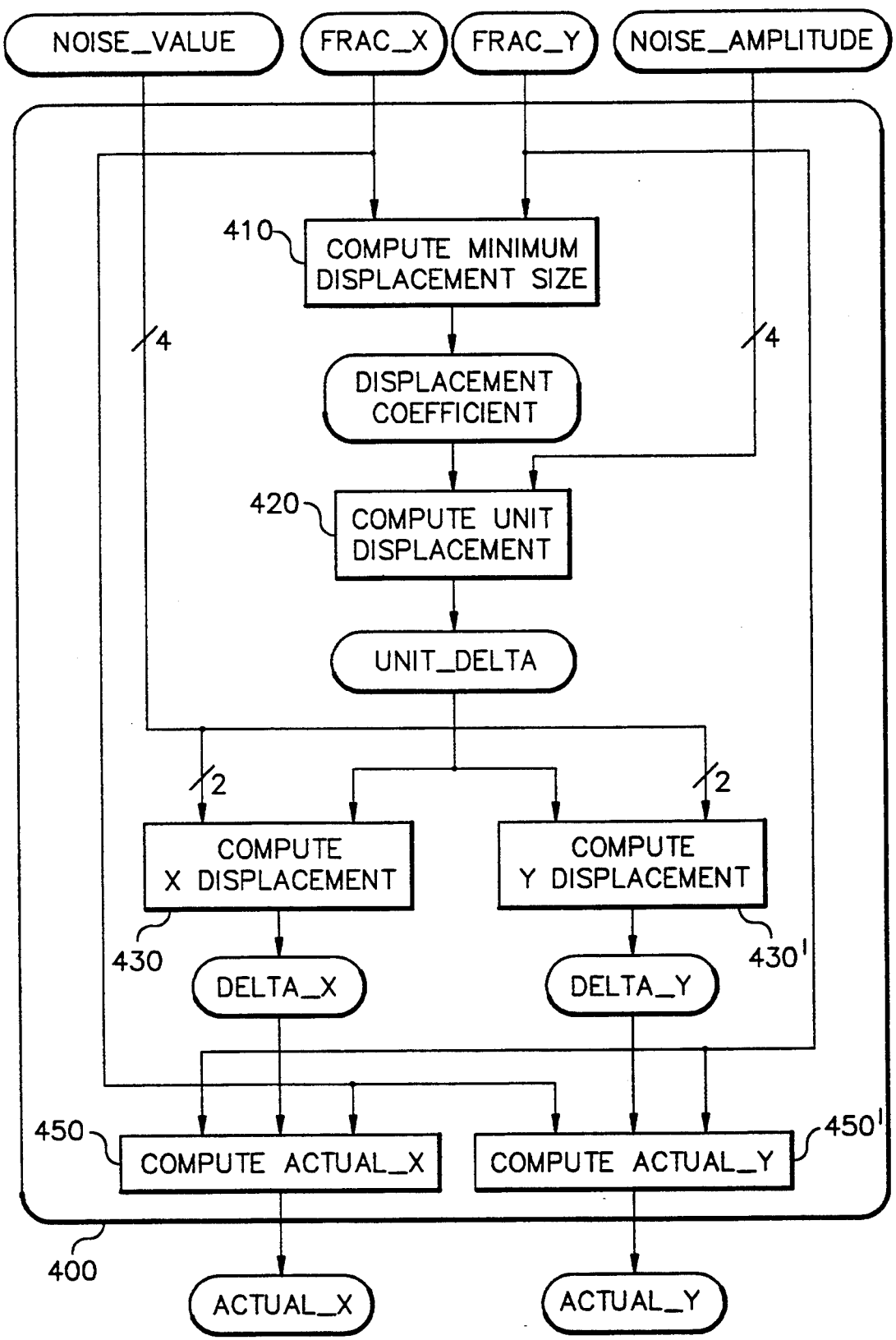
FIG. 10 illustrates, in further detail, the Displacement Engine block of FIG. 7.

The displacement engine 400, illustrated in schematic form in FIG. 10, functions to provide the displacement (deviation) of the sampling points of the dots. The displacement engine 400 receives as inputs the signal noise_value from a noise_field 210, shown in FIG. 7, that is an array of pseudo-random integers which when selected determine which displacement pattern will be used by the displacement engine. The displacement pattern is selected by the value of int_X, int_Y. A noise amplitude value, that is user selected, is also directed to the displacement engine 400 to scale the size of the displacement because, although the patterns are predetermined their relative size is not predetermined. Also received as an input to the word_splitting block 200 is the X-Y halftone sampling coordinates (pixel_X, pixel_Y) corresponding to the position of the pixel that is to be written (printed). The displacement engine 400 also receives as an input the values frac_X, frac_Y from the word_splitting block 200 and provides at its output the actual printing coordinates (actual_X, actual_Y).

Referring to FIG. 10, the displacement engine 400 computes the minimum displacement size from the values of frac_X and frac_Y in block 410 to provide a displacement coefficient signal. A compute unit displacement block 420 provides a unit_delta value from a combination of the displacement coefficient and the noise_amplitude value. A compute X displacement block 430 and a compute Y displacement block 430' receive as inputs the noise_value and the unit_delta value to provide at their outputs the values delta_X and delta_Y, respectively. A combination of the noise_value, frac_X, frac_Y, and the respective delta_values in the compute actual_X box 450 and the compute actual_Y box 450' form the actual_X and the actual_Y values, respectively.

Figure 17D:
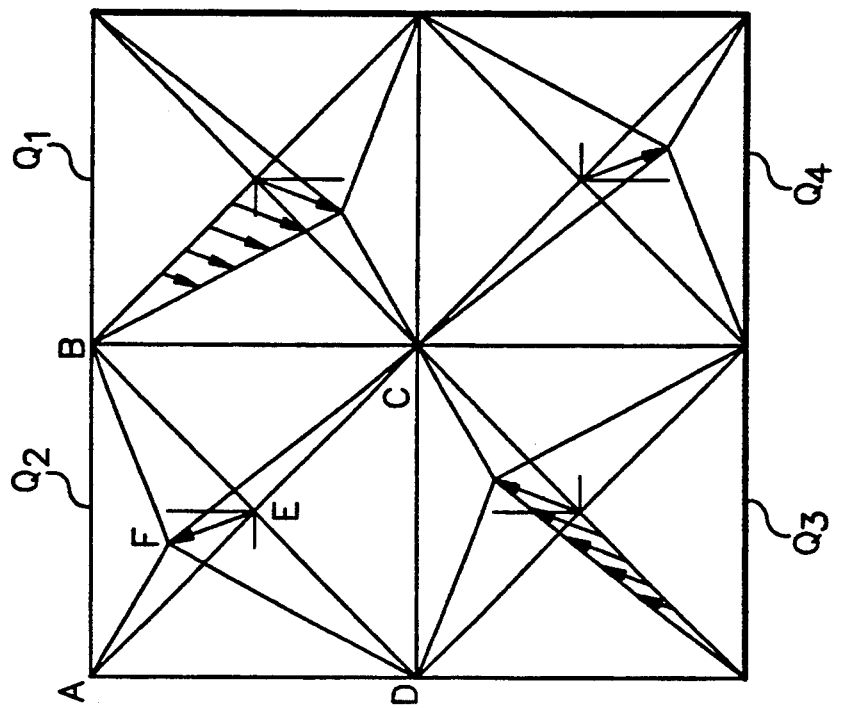
FIGS. 17A through 17F are action blocks illustrating the effect of the displacement engine on a dot printing pattern.

The displacement coefficient is a number ranging from 0.0 to 0.25 which indicates the relative amount of displacement to be applied to the sample point in question. The value of the displacement coefficient depends only on the location of the sample point and will be discussed later in conjunction with FIG. 17D.

Figure 11:
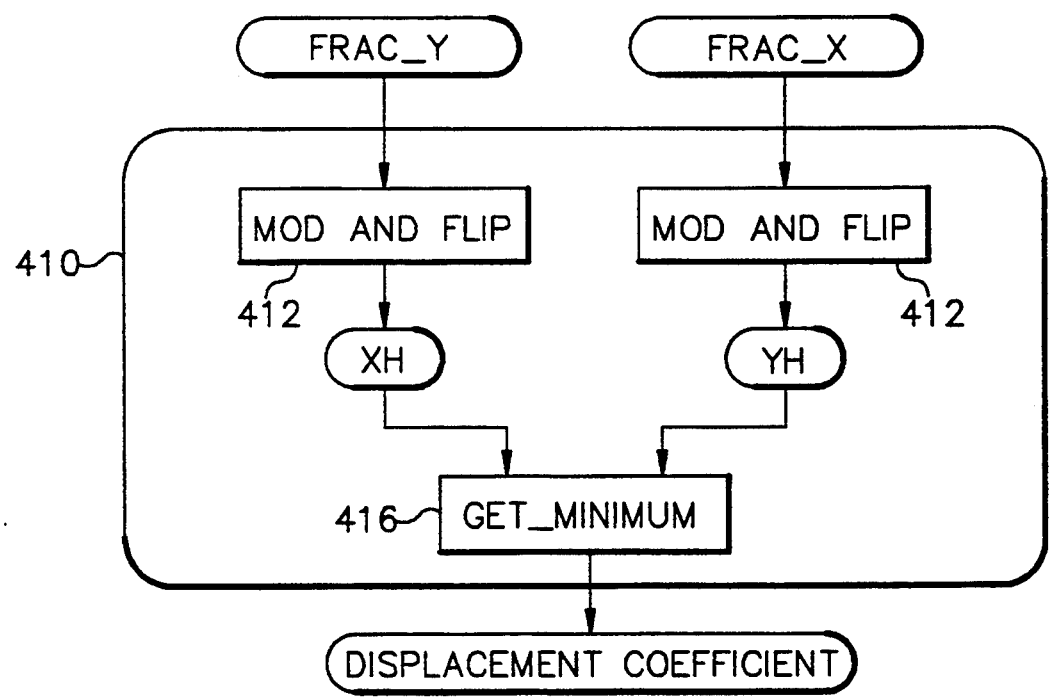
FIG. 11 illustrates, in further detail, the Compute Minimum displacement block of FIG. 10.
Figure 12:
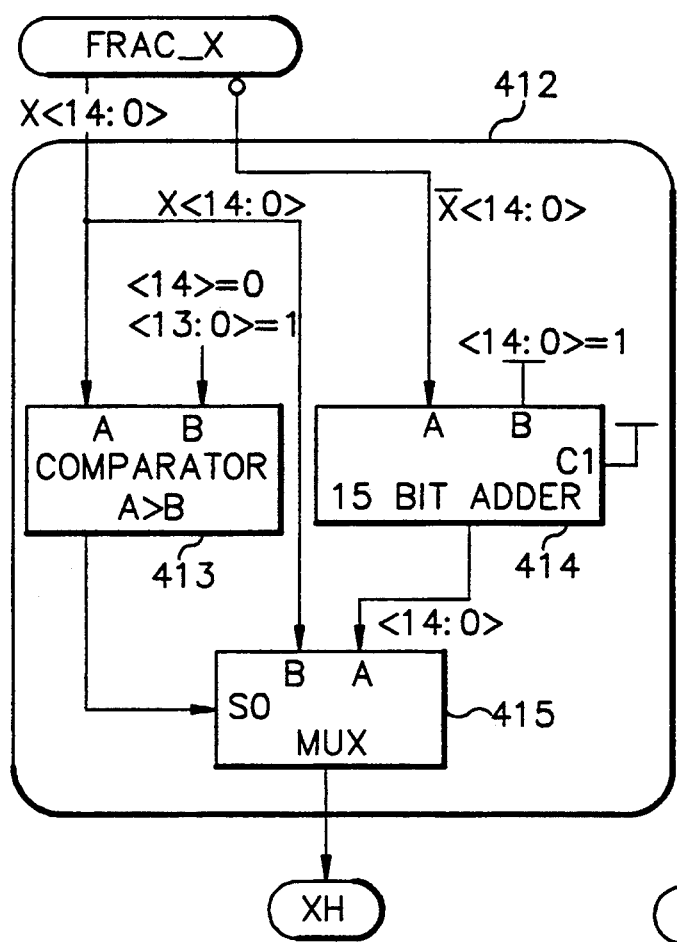
FIG. 12 illustrates, in further detail, the Mod and Flip block of FIG. 11.
Figure 13:
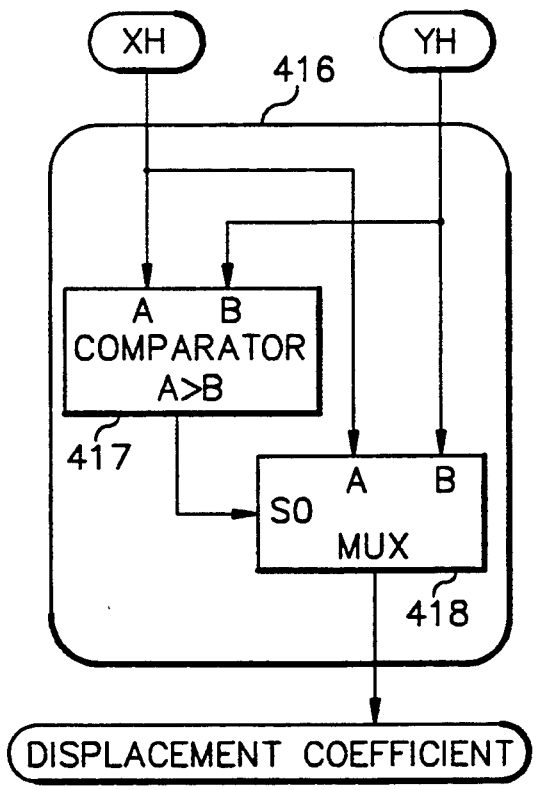
FIG. 13 illustrates, in further detail, the Get Minimum block of FIG. 11.

Referring to FIG. 11, block 410 is comprised of identical mod and flip circuits 412 and 412', and a get_minimum circuit 416. The mod and flip circuit 412 is illustrated in further detail in FIG. 12 and the get_minimum circuit is illustrated in further detail in FIG. 13. In operation, the mod and flip circuit 412 receives as an input the value frac_X and the negated value of frac_X. The frac_X value is directed to the A input of a comparator 413 and to the B input of a multiplexer 415. The negated value of frac_X is directed to the A input of a 15 bit adder 414. The B input to the comparator is set with bit value 14 equal to zero and the other bits 0 through 13 being set to one. Input B and C1 of the adder 414 are set to a 1. Comparator 413 compares the bit values on its A and B inputs and outputs a multiplexer selection signal to the S0 input of multiplexer 415 to select the multiplexer's A input when the value on the comparator's A input is greater than the value at its B input. When the value at the B input is greater than the value at the A input the comparator selects the value on the B input of the multiplexer to be outputted as the value Xh. In a like manner the value frac_Y is processed by block 412' to provide the value Yh.

The values of Xh and Yh are inputs to the get_minimum circuit 416. Within block 416 is a comparator 417 that receives on its A input the value Xh and on its B input the value Yh. When the value Xh exceeds the value Yh comparator 417 provides a selection signal to a multiplexer 418 to pass the value Xh to the output of the multiplexer as the displacement coefficient. If the value of Yh is greater than the value of Xh, the multiplexer is selected to provide the signal Yh at its output.

Figure 14:
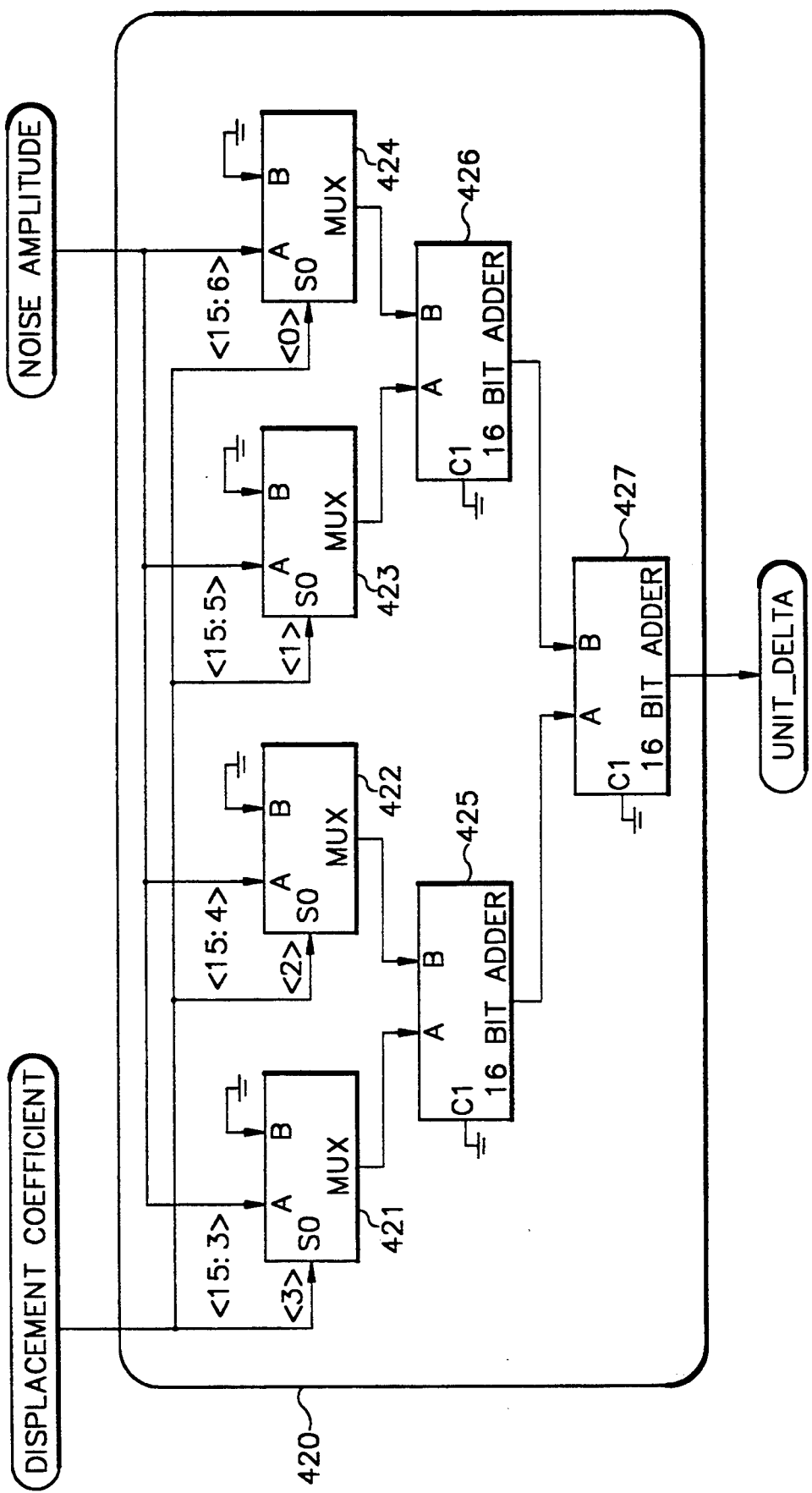
FIG. 14 illustrates, in further detail, the Compute Unit Displacement block of FIG. 10.

The displacement coefficient value is forwarded to the compute unit displacement block 420, illustrated in detail in FIG. 14. The circuit of block 420 is formed of a plurality of multiplexers 421 through 424, and three 16 bit adders 425, 426, and 427. Each of the multiplexers receives on their A inputs the displacement coefficient signal right shifted 3, 4, 5, and 6 bit positions, respectively. The B inputs are all set to 0. The output of multiplexers 421 and 423 are directed to the A inputs of the 16 bit adders 425 and 426, respectively. The output of multiplexers 422 and 424 are directed to the B inputs of multiplexers 425 and 426, respectively. The S0 inputs to the multiplexers 421 through 424 are the bits 3, 2, 1, and 0, respectively, of the 4 bit noise amplitude signal. The CI inputs to the adders are connected to be 0. The outputs from the adders 425 and 426 are directed to the A and B inputs, respectively of adder 427. The output of adder 427 is the value unit_delta.

The action of block 420 is to compute the unit_delta value by multiplying the displacement coefficient by the noise amplitude. The displacement coefficient varies as a function of the sample point location but the noise amplitude is a scaling value which is independent of sample point location. The noise amplitude is used to tune the displacement effects in light of the intended halftone line ruling and the raster pitch of the marking engine.

Figure 15:
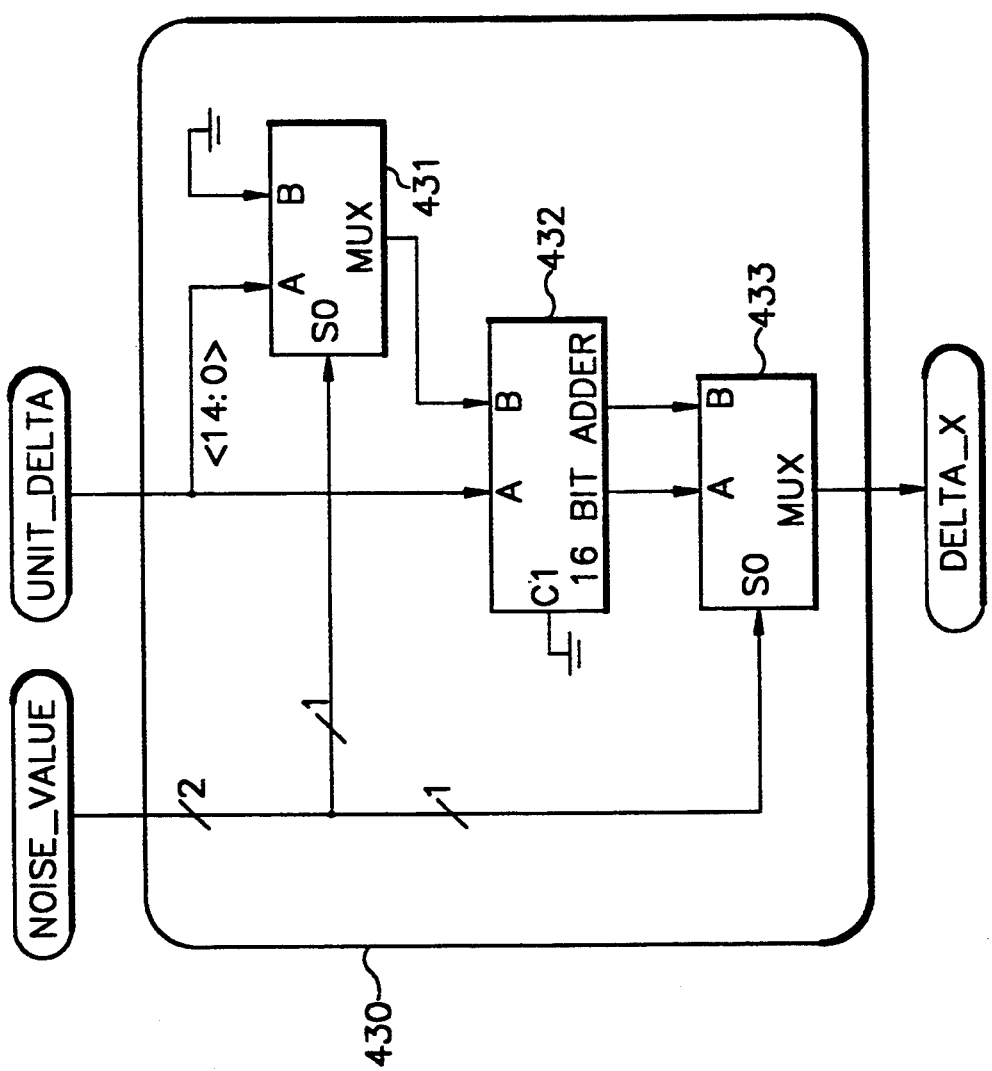
FIG. 15 illustrates, in further detail, the X and Y Compute Displacement blocks of FIG. 10.

In FIG. 15, the compute displacement block 430 is illustrated as being comprised of a multiplexer 431, a 16 bit adder 432, and a multiplexer 433. A 2 bit signal, noise_value, has the highest order bit applied to the SO input of the multiplexer 431. The A input of the multiplexer 431 receives a shifted left one bit signal, unit_ delta. The unit_delta value will have a high order zero as the most significant bit therefore meaningful data is not lost. The B input to multiplexer 431 is wired to be 0. The output will be 0 when SO is high and will be the left shifted value of unit_delta when SO is low. The adder 432 receives on its A input the unit_delta value signal and on the B input the output of the multiplexer 431. The CI input is connected to be 0. The adder 432 sums the A and B inputs to provide at its outputs the sum and the negated sum values which in turn are directed to the A and the B inputs, respectively, of the multiplexer 433. The low order noise_value bit is directed to the SO input to the multiplexer 433 to select either the sum or the negated sum values that are passed to the output as the delta_X value. An identical block 430' provides the delta_Y value. To be noted the block 430 receives the high order two bits of the noise_value signal while the block 430' receives the low order two bits.

Figure 16:
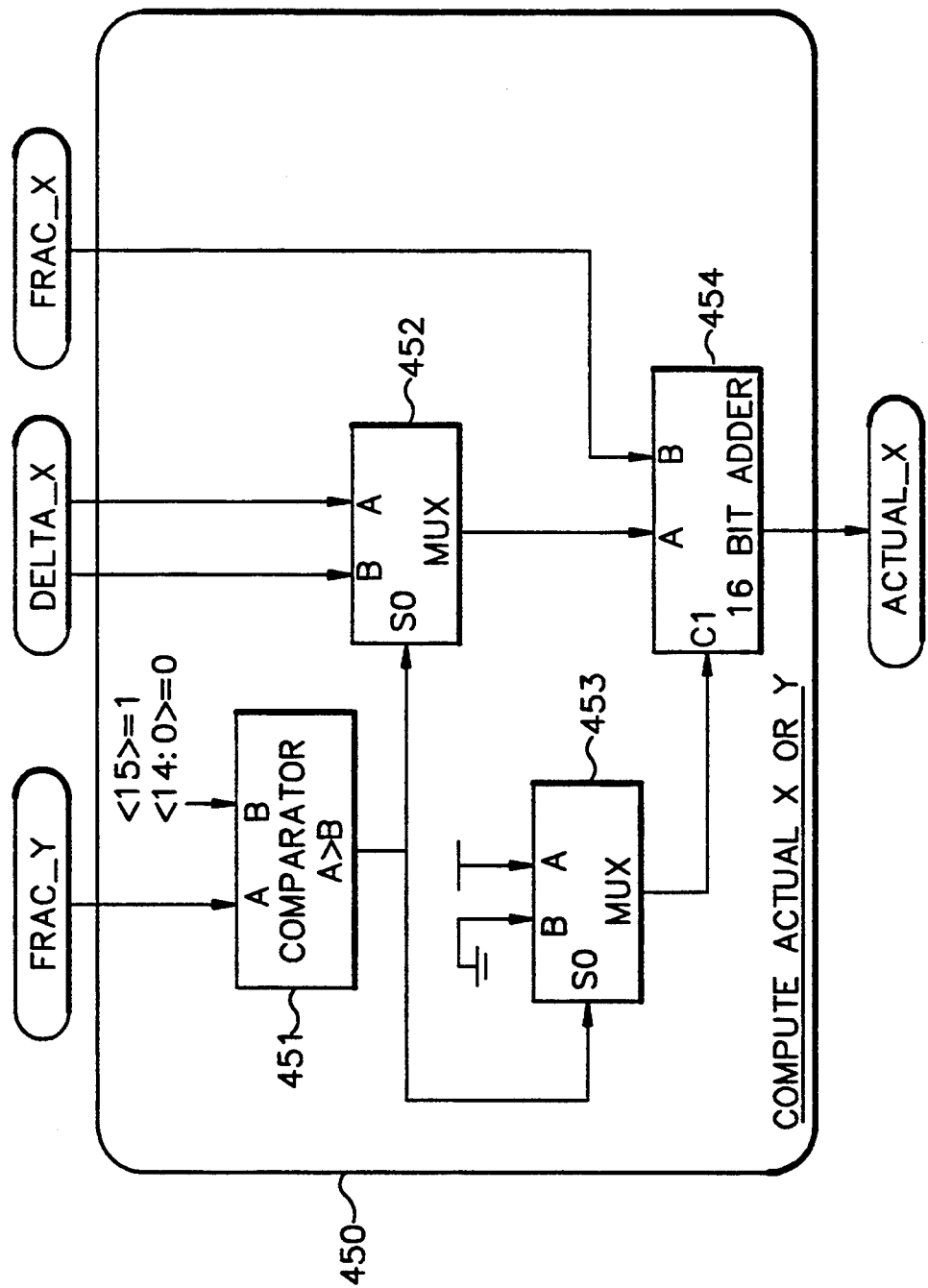
FIG. 16 illustrates, in further detail, the Compute Actual X and Y blocks of FIG. 10.

Referring to FIG. 16, block 450 is comprised of two multiplexers 452 and 453, a comparator 451, and a 16 bit adder 454. The comparator 451 receives the value of frac_Y on its A input and on the B input the 15th ordered bit is set to 1 and the bits 14 to 0 are set equal to 0. An output of 1 is provided to the SO inputs of the multiplexer 452 and 453 when the value of A is greater than the value at B. The multiplexer 452 receives on its B and A input the delta_X and the negated delta_X signals, respectively. When SO is high the value on A is passed to the A input of the 16 bit adder 454, otherwise the value on B is passed. The adder 454 receives on its B input the value of frac_X, which is summed with the value on the A input. The CI input to the adder is the output from the multiplexer 543 that is 0 when SO is low and is a 1 otherwise. The output of the adder 454 is the value actual_X. Block 450' is the same as block 450 except the inputs frac_Y and frac_X are interchanged and delta_X is replaced by delta_Y. The adder 454 either adds or subtracts the delta_X value from the frac_X value depending on whether frac_Y is less than or greater than ½, respectively. The ½ value is taken from the size of a normalized cell of unit size 1.

Figure 17A:
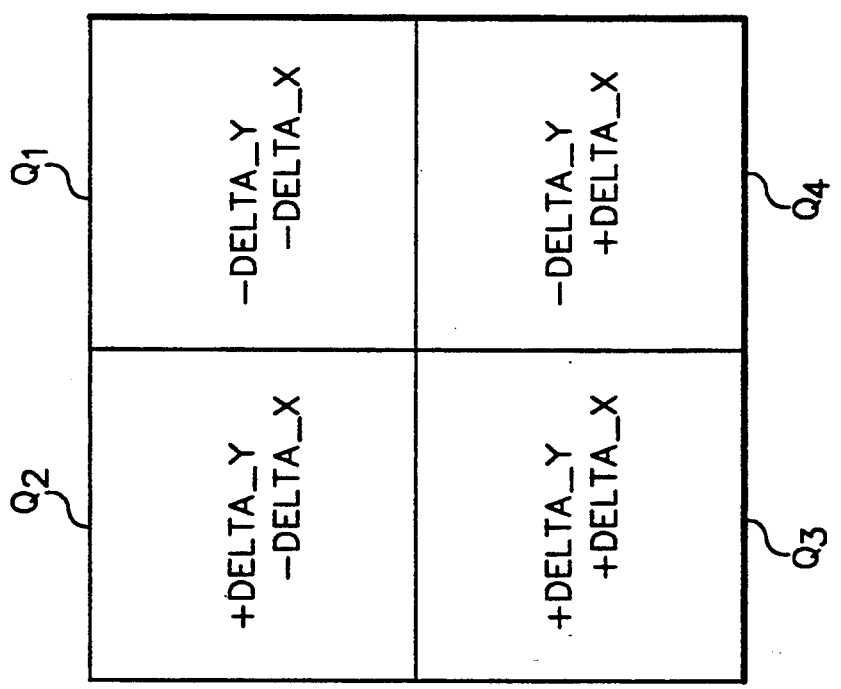
Figure 17C:
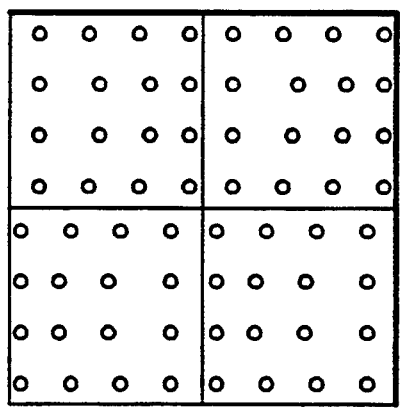
Figure 17E:
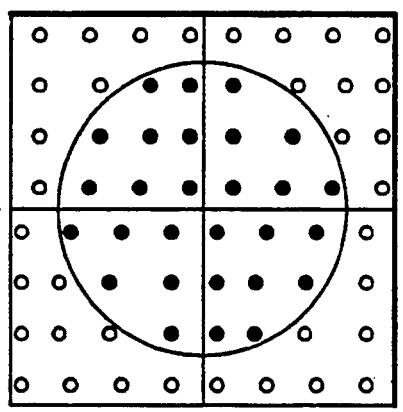
Figure 17B:
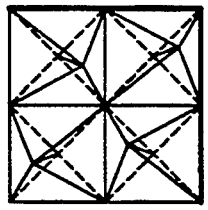
Figure 17B:
Figure 17B:
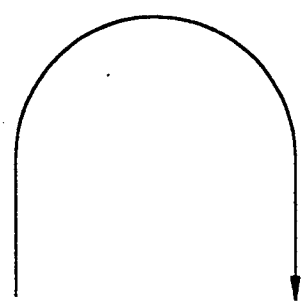
Figure 17B:
Figure 17B:
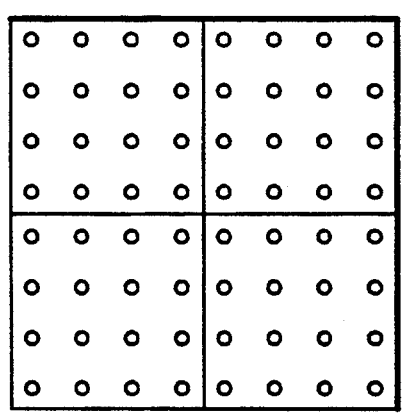
Figure 17F:
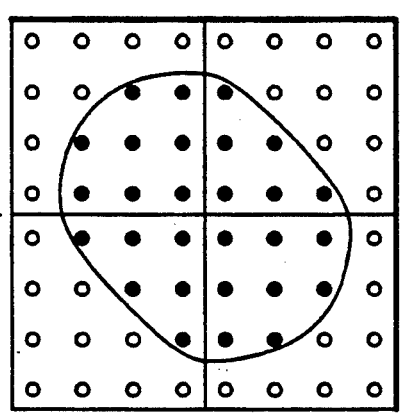

At this point in the description reference will be had to pictorial representations of the actions that occur in the four quadrants, Q1 through Q4, of a unit cell as an aid to the understanding of the operation of the invention. It is important that the changes in all four quadrants be coordinated such that the resulting dot has the same area and center of gravity as the original dot. Beginning with FIG. 17A, the four quadrants of a unit cell are identified as Q1 through Q4. Within each of the quadrants the delta_X and the delta_Y sign combinations are identified. FIG. 17B, illustrates a simplified uniformly spaced sampling pattern for a dot in a unit cell. The simplification is in the number of sample points shown, it being understood that many more points are used in a commercially viable system. With that in mind we now wish to displace the sampling points according to the teachings of the present invention. The displaced sampling points are shown in FIG. 17C. The pattern of displacement, in terms of movement from the non-displaced position, is not easily discernible from a comparison of FIGS. 17B and 17C. As an additional aid reference is now made to FIG. 17D wherein for a non-displaced condition the triangles ABE, AED, DEC, and CEB, in quadrant Q2, each will thus contain the same number of sample points that are equally displaced from each other within their respective triangles. Although not specifically discussed the same holds true for the triangles indicated in quadrants Q1, Q3, and Q4. When a fixed amount of distortion is applied, it is applied such that the points at the outersides of the quadrant sides AB, BC, CD, and DA will not be displaced and or displaced only a minimum amount while the points in the center will be displaced the most. This can be visualized by assuming that a thin rubber film is cut to the size of quadrant ABCD and that the film is painted with uniformly spaced dots to represent sample points similar to those of FIG. 17B. With the rubber film held in place along the outer edges of the quadrant the center point E is moved to point F where the maximum displacement of point E occurs. It is thus apparent that the sample points intermediate between point E and any of the sides will be displaced in the same direction as the line segment EF, but by an amount that is proportional to the point's distance to the edge of the quadrant. This "distance-to-quadrant-edge" value has been previously named the displacement coefficient and is computed in block 110 of FIG. 11. The displacement that occurs in the remaining quadrants is identical in kind, but is symmetrically flipped and or rotated as shown. It is to be noted that the pattern of displacement exhibits point symmetry about the point C, the center of the unit cell. Referring now to FIG. 17E, the circle shown at the center of the unit cell is a representation of the dot shape. Without distortion of the sampling points the dot would be printed as the circle shown. With the distorted sampling pattern of FIG. 17C superimposed over the circular dot shape it can be seen that the darkened sample points within the circle are no longer uniformly spaced. Each of the darkened sample points represents a point that will be printed. The data representing these points is then transferred to a writer. Referring now to FIG. 17F, the writer writes the spots using a uniformly spaced raster that causes the circular dot of FIG. 17E to undergo the desired shape (noise) distortion.

Figure 18:
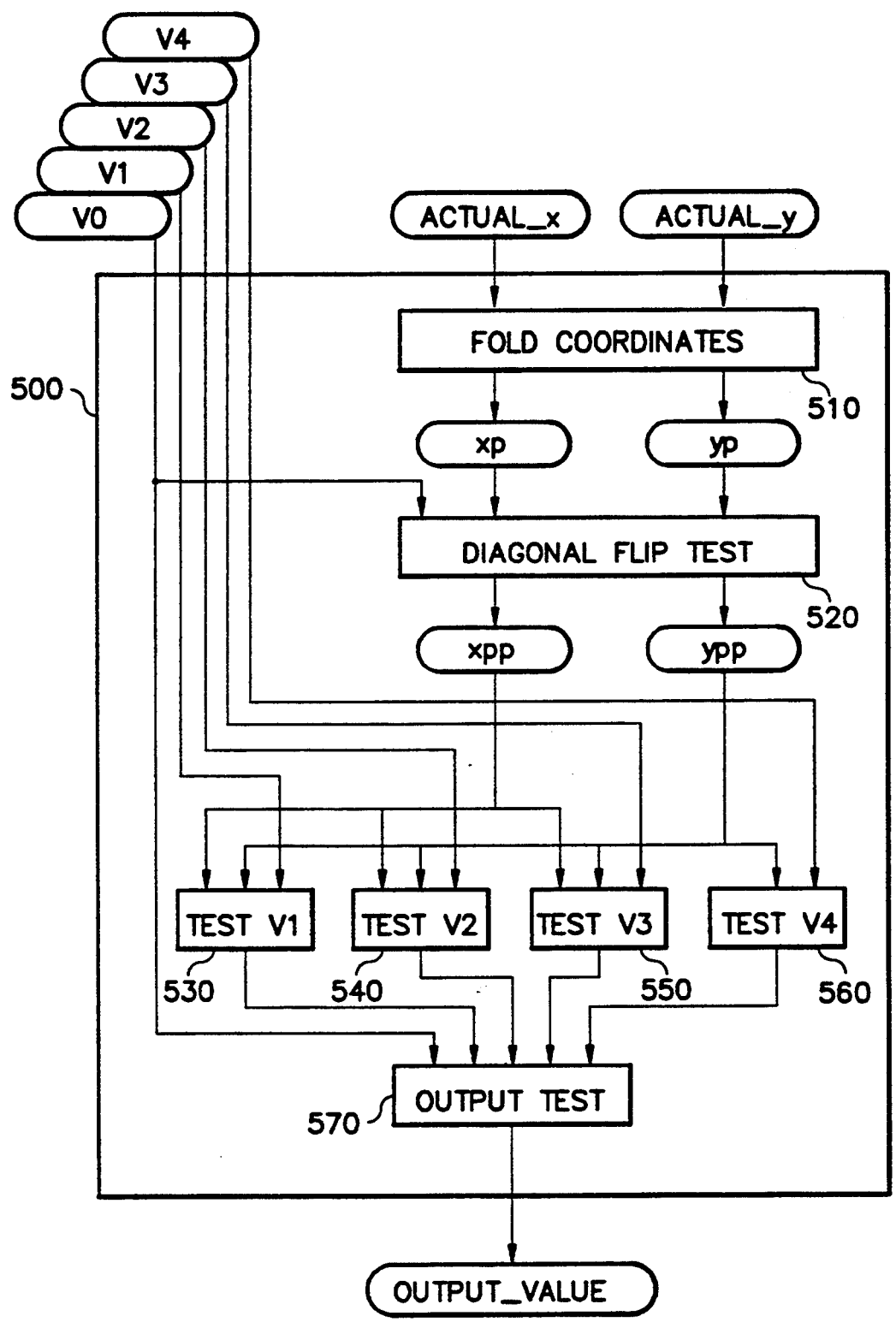
FIG. 18 illustrates, in further detail, the Algebraic_ Engine of FIG. 7.

The algebraic_engine 500, illustrated in detailed logic form in FIG. 18, functions to compute the screener output. The output value is a single bit intended for a binary writer and is a function of both the dot parameters and the sampling point (actual_X, actual_Y). Over time the output is a bit sequence similar to that generated by the font memory 970 of the #622 patent but with less cost. These logic modules may be run in parallel to achieve multi-bit output if desired. In FIG. 18 the values actual_X and actual_Y are directed to the fold coordinates function block 510, wherein it is determined whether the Y coordinate is greater than the X coordinate indicating that the point is in the upper left triangle rather than the lower left one. If Y is greater than X then $X_p =$ actual_Y and $Y_p =$ actual_X. This action flips the point in the upper triangle about the axis AC to the lower triangle (see FIGS. 6A and 6B). If actual_X is less than or equal to actual_Y, then no change is made, i.e., $Y_p =$ actual_X and $X_p =$ actual_Y. Either way the point ($X_p$, $Y_p$) ends up in the lower right triangle.

The diagonal flip test 520 depends on the bit Vo, indicating whether the dot area is above 50% or not. Referring back to FIGS. 6A and 6B, if the dot has an area greater than 50% of the reference cell the point ($X_p$, $Y_p$) must be rotated about the axis EE′ yielding point ($X_{pp}$, $Y_{pp}$). If the dot is 50% or less, no change is required, i.e., $X_{pp} = X_p$ and $Y_{pp} = Y_p$. In either case ($X_{pp}$, $Y_{pp}$) will be compared against a convex envelope located in the top portion of the triangle ABC.

Once the position of the envelope within the triangle ABC is determined, testing for the point being above or below the envelope may begin. It is to be remembered that the intersect points $V_1$-$V_4$ pertain to lines $L_1$-$L_4$ having slopes $-1$, $-\frac{1}{2}$, $-\frac{1}{4}$, and zero respectively.

Test $V_1$ is a test to see if the point ($X_{pp}$, $Y_{pp}$) is above or below line $L_1$. If above- the test is true.

Test $V_2$, $V_3$, and $V_4$ are similar tests for their respective lines.

The output test 570 has two parts, the first determines whether the point ($X_{pp}$, $Y_{pp}$) is above the envelope or not. It is above the envelope if all four tests are true. The second part determines whether the point ($X_{pp}$, $Y_{pp}$) is within or is outside the dot to cause a printing if inside.

Figure 19A:
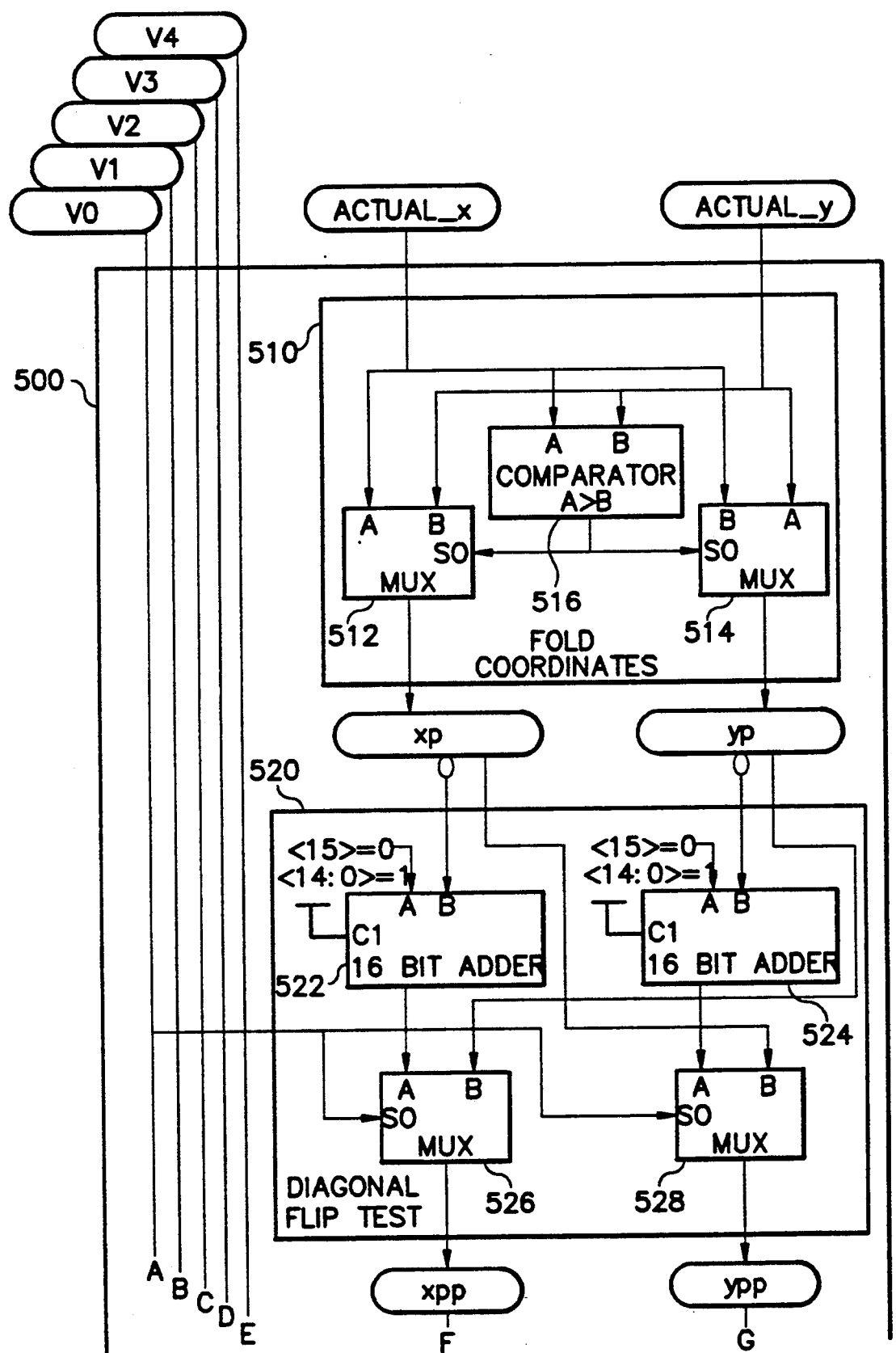
FIGS. 19A and 19B illustrate, in further detail, the Algebraic_Engine of FIG. 18.
Figure 19B:
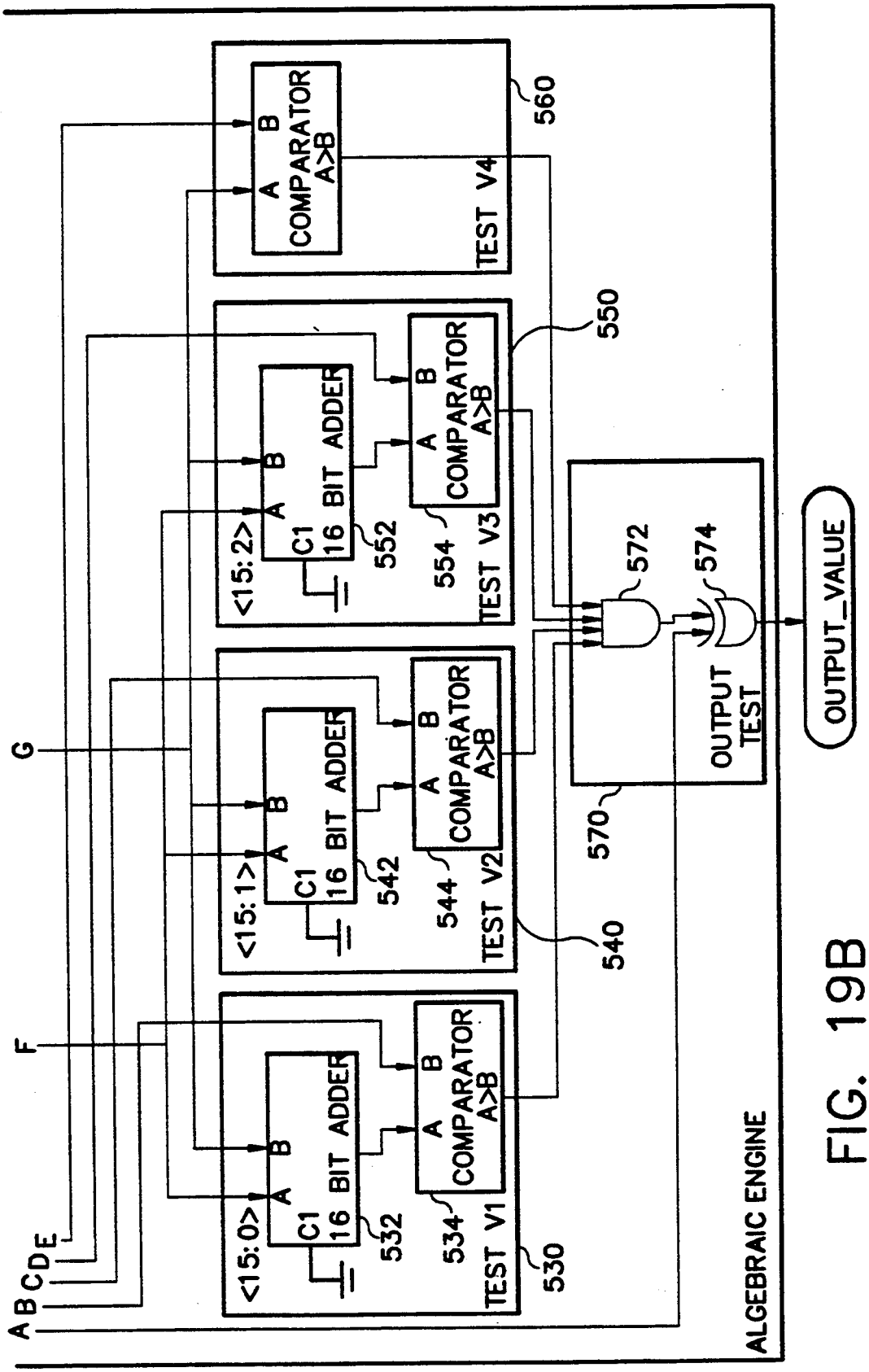

Referring specifically to FIGS. 19A and 19B, the algebraic engine 500 receives as inputs the dot parameter values V0, V1, V2, V3, and V4. Parameters' V1-V4 are directed to the B inputs of comparators' 534, 544, 554, and 560, respectively. The algebraic engine 500 also receives as inputs the actual_X and actual_Y signals. The actual_X signal is applied to the A inputs of the multiplexer 512 and the comparator 516 and to the B input to multiplexer 514. The actual_Y signal is applied to the B inputs of the multiplexer 512 and the comparator 516 and to the A input of multiplexer 514.

The output signal from the comparator 516 is used as the selection signal for the multiplexers 512 and 514 and is applied to the selection input labeled S0. Multiplexers 512 and 514 provide at their outputs the signal Xp and Yp, respectively. These signals are directed to the inputs of the diagonal flip test logic 520. The diagonal flip test is performed with two 16 bit adders 522 and 524 and two multiplexers 526 and 528. The A inputs of the adders each receive 16 bit signals wherein bit 15 is set to 0 and bits 14 through 0 are set equal to 1. The B inputs are the respective Xp and Yp signals negated. The flip bit, Vo, is directed to the selection inputs, labeled S0 for multiplexers 526 and 528. If flipping is to occur the cross coupled signals on the B inputs of the multiplexers 526 and 528 are passed to the outputs. Otherwise the signals on the A outputs are passed.

The 16 bit adders 532, 542, and 552 receive on their A inputs the signal Xpp and on their B inputs the signal Ypp. The comparator of 560, performs Test V4, and receives the signal Ypp on its A input and the signal V4 on its B input. Comparators' 534, 544, and 554 receive on their A inputs the output signals from adders 532, 542 and 552, respectively. The comparators' B inputs are connected to receive the signals V1, V2, and V3, respectively. The outputs of each of the comparators is provided as an input to an AND gate 572. The output test logic 570 also includes an Exclusive-OR gate 574 that receives the flip bit V0 and the output from the AND gate 572 to provide at its output the signal output_value.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Industrial Applicability and Advantages

The method and associated apparatus of the present invention may be used in any system that prints halftone dots wherein the dots are stored as digital values. The advantage of the present invention is that the dots are deformed through the means of a displacement engine to introduce noise into the printing position of the dots. The deformation in turn suppresses moire patterns.

I claim:

1. An apparatus for noise distorting printing of a halftone dot while maintaining an area of the halftone dot and a center of gravity of the halftone dot, wherein said halftone dot is formed of separate pixels, said apparatus comprising:
    means for determining a position, within a screened halftone reproduction, of each pixel prior to printing as part of the halftone dot and for representing the determined position as a set of coordinate values;
    noise pattern means responsive to the set of coordinate values of each pixel for providing a noise pattern that is randomly selected from a plurality of noise patterns;
    computing means for computing a unit displacement from the set of coordinate values of each pixel; and
    means for receiving the noise pattern from the noise pattern means and the computed unit displacement from the computing means to compute an actual displacement value to be applied to the set of coordinate values of each pixel such that positions closer to a center of the halftone dot have a lesser displacement value and positions closer to centers of areas of dot symmetry quadrants have a greater displacement value wherein the area of the halftone dot after application of the actual displacement value is equivalent to the area of the halftone dot before application of the actual displacement value.

2. A method for noise distorting printing of a halftone dot while maintaining an area of the halftone dot and center of gravity of the halftone dot, wherein the area of said halftone dot is defined by points, said method comprising the steps of:
    a) generating a digital value for each point of the halftone dot;
    b) assigning a unit cell, divided into four quadrants and representing the area into which the points of the halftone dot are to be printed;
    c) assigning a delta deviation value to the points within each of the four quadrants of the unit cell such that points closest to a center of the unit cell have a least amount of displacement and points closest to centers of each of the quadrants have a greatest amount of displacement wherein the area defined by the points after assignment of the delta deviation value is equivalent to the area defined by the points before assignment of the delta deviation value; and d) printing the halftone dot by combining the delta deviation value of each point within the unit cell with the digital value for each point of the halftone dot to cause a printing of the digital value at a position corresponding to a combined delta deviation value.

3. The method according to claim 2 and further comprising the step of:

i) modulating the assigned delta deviation values with a noise value selected at random for each halftone dot to be printed.

4. The method according to claim 2 and further comprising the step of:

i) combining the delta deviation values with a noise amplitude value.

5. A method for noise distorting printing of a halftone dot while maintaining an area of the halftone dot and center of gravity of the halftone dot, wherein the area of said halftone dot is defined by points, said method comprising the steps of:

a) generating digital values representing an envelope of the halftone dot;

b) assigning a unit cell divided into four quadrants and representing the area into which the halftone dot is to be printed by a plurality of points;

c) assigning a delta displacement value to the points within each of the four quadrants of the unit cell such that points closest to a center of the unit cell have a least amount of displacement and points closest to centers of each of the quadrants have a greatest amount of displacement wherein the area represented by the points after assignment of the delta displacement value is equivalent to the area represented by the points before the assignment of the delta displacement value; and d) printing a noise distorted halftone dot by combining a delta deviation value of the points within the unit cell corresponding to points within the envelope of the halftone dot to cause a printing of the noise distorted halftone dot with an envelope corresponding to combined delta deviation values.

6. The method according to claim 5 and further comprising the step of:

i) modulating the assigned delta displacement values with a noise value selected at random for each dot to be printed.

7. The method according to claim 5 and further comprising the step of:

i) combining the delta displacement values with a noise amplitude value.

8. A method for noise distorting the printing of a halftone dot while maintaining an area of the halftone dot and a center of gravity of the halftone dot, wherein the area of said halftone dot is defined by points, said method comprising the steps of:

a) generating digital values representing a symmetrical portion of an envelope of the halftone dot;

b) referencing a unit cell, divided into four quadrants and representing the area into which the points of the halftone dot are to be printed;

c) assigning a delta deviation value to each point within each of the four quadrants of the unit cell such that points closest to a center of the unit cell have a least amount of displacement and points closest to centers of each of the quadrants have a greatest amount of displacement wherein the area defined by the points after assignment of the delta deviation value is the same as the area defined by the points before the assignment of the delta deviation value;

d) generating digital values representing the entire portion of the envelope of the halftone dot from the digital values representing a symmetrical portion of the envelope of the halftone dot; and e) printing the halftone dot by combining the delta deviation value of each point within the unit cell with the associated digital values representing the entire portion of the envelope of the halftone dot for each point of the halftone dot to cause a printing of the digital value at a position corresponding to a combined delta deviation value.

9. The method according to claim 8 and further comprising the step of:

i) modulating the assigned delta deviation values with a noise value selected at random for each dot to be printed.

10. The method according to claim 8 and further comprising the step of:

i) combining the delta deviation values with a noise amplitude value.

11. A method for noise distorting the printing of a halftone dot while maintaining an area of the halftone dot and a center of gravity of the halftone dot, wherein the area of said halftone dot is defined by points, said method comprising the steps of:

a) generating digital values representing a symmetrical portion of an envelope of the halftone dot;

b) referencing a unit cell, divided into four quadrants and representing the area into which the points of the halftone dot are to be printed;

c) assigning a delta deviation value to each point within one of the four quadrants of the unit cell such that points closest to a center of the unit cell have a least amount of displacement and points closest to a center of the one quadrant have a greatest amount of displacement d) generating digital deviation values for points within each of the remaining three quadrants from the assigned delta deviation values wherein the area represented by the points after the assignment of the delta deviation values and the generation of the digital deviation values is the same as the area represented by the points before the assignment of the delta deviation values and the generation of the digital deviation values;

e) generating digital values representing the entire portion of the envelope of the halftone dot from the digital values representing a symmetrical portion of the envelope of the halftone dot; and f) printing the halftone dot by combining the delta deviation value of each point within the unit cell with the associated digital values representing the entire portion of the envelope of the halftone dot for each point of the halftone dot to cause a printing of the digital value at a position corresponding to a combined delta deviation value.

12. The method according to claim 11 and further comprising the step of:

i) modulating the assigned delta deviation values with a noise value selected at random for each dot to be printed.

13. The method according to claim 11 and further comprising the step of:

i) combining the delta deviation values with a noise amplitude value.

14. A method for noise distorting the printing of a halftone dot while maintaining an area of the halftone dot and a center of gravity of the halftone dot, wherein the area of said halftone dot is defined by points, said method comprising the steps of:

a) generating a digital value for each point of the halftone dot;

b) assigning a delta displacement value to each point of the halftone dot such that points closest to a center of the halftone dot have a least amount of displacement and points closest to centers of areas of dot symmetry quadrants have a greatest amount of displacement wherein the area of the halftone dot represented by the points after assignment of the delta displacement value is equivalent to the area represented by the points before the assignment of the delta displacement value; and c) printing the halftone dot by combining the delta displacement value with the associated digital value for each point of the halftone dot to cause a printing of the digital value at a position corresponding to a combined delta displacement value.

15. The method according to claim 14 and further comprising the step of:

i) modulating the assigned delta displacement values with a noise value selected at random for each dot to be printed.

16. The method according to claim 14 and further comprising the step of:

i) combining the delta displacement values with a noise amplitude value.

* * * * *

UNITED STATES PATENT AND TRADEMARK OFFICE
CERTIFICATE OF CORRECTION

PATENT NO. : 5,448,366
DATED : Sep. 5, 1995
INVENTOR(S) : John F. Hamilton, Jr.

It is certified that error appears in the above-indentified patent and that said Letters Patent is hereby corrected as shown below:

On title page, item [54] and column 1, line 2, in the title:
Delete "PAINTING" and insert -- PRINTING -- .

Signed and Sealed this

Fifth Day of December, 1995

Attest:

BRUCE LEHMAN

Attesting Officer

Commissioner of Patents and Trademarks